(12) United States Patent
Bak

(10) Patent No.: US 10,948,725 B2
(45) Date of Patent: Mar. 16, 2021

(54) WEARABLE DISPLAY APPARATUS AND METHOD OF DISPLAYING THREE-DIMENSIONAL IMAGES THEREON

(71) Applicant: SAMSUNG ELECTRONICS CO., LTD., Suwon-si (KR)

(72) Inventor: Bonggil Bak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/355,902

(22) Filed: Mar. 18, 2019

(65) Prior Publication Data

US 2019/0310479 A1 Oct. 10, 2019

(30) Foreign Application Priority Data

Apr. 9, 2018 (KR) .......................... 10-2018-0041164

(51) Int. Cl.
*G02B 27/01* (2006.01)
*G06T 19/00* (2011.01)
(Continued)

(52) U.S. Cl.
CPC ......... *G02B 27/0172* (2013.01); *G06F 3/012* (2013.01); *G06F 3/013* (2013.01);
(Continued)

(58) Field of Classification Search
CPC .............. G02B 27/017; G02B 27/0172; G02B 27/0176; G02B 27/0093;
(Continued)

(56) References Cited

U.S. PATENT DOCUMENTS 5,933,125 A * 8/1999 Fernie ................. G02B 27/017
345/619
9,262,999 B1 * 2/2016 Froment ................. G06F 3/017
(Continued)

FOREIGN PATENT DOCUMENTS

JP 2000308092 A 11/2000
JP 3921770 B2 5/2007
(Continued)

OTHER PUBLICATIONS

Written Opinion (PCT/ISA/237) dated Jun. 24, 2019, issued by the International Searching Authority in counterpart International Application No. PCT/KR2019/003234.
(Continued)

*Primary Examiner* — Priyank J Shah
(74) *Attorney, Agent, or Firm* — Sughrue Mion, PLLC

(57) ABSTRACT

A wearable display apparatus is provided. The wearable display apparatus according to an embodiment includes a display, a sensor configured to detect motion of the wearable display apparatus and output motion data corresponding to the motion of the wearable display apparatus, the output motion data including a non-zero roll component, and a processor configured to obtain three-dimensional (3D) image data, obtain the output motion data from the sensor, generate a first virtual reality (VR) 3D image based on the obtained 3D image data and a portion of the obtained motion data excluding the non-zero roll component, and control the display to display the generated first VR 3D image.

19 Claims, 17 Drawing Sheets

(51) Int. Cl.
*G06F 3/01* (2006.01)
*H04N 13/344* (2018.01)

(52) U.S. Cl.
CPC ......... *G06T 19/006* (2013.01); *H04N 13/344* (2018.05); *G02B 2027/014* (2013.01); *G02B 2027/0187* (2013.01)

(58) Field of Classification Search
CPC ..... G02B 2027/0132–0136; G02B 2027/0174; G02B 2027/0178; G02B 2027/0187; G06F 3/012; G06F 3/013; H04N 5/7491; H04N 13/344
See application file for complete search history.

(56) References Cited

U.S. PATENT DOCUMENTS

| | | | |
|---|---|---|---|
| 9,317,975 B2 | 4/2016 | Moon et al. | |
| 9,477,085 B2 | 10/2016 | Kim et al. | |
| 2011/0145150 A1 | 6/2011 | Onischuk | |
| 2013/0128364 A1 | 5/2013 | Wheeler et al. | |
| 2013/0235169 A1* | 9/2013 | Kato | G02B 27/01 348/53 |
| 2015/0128075 A1* | 5/2015 | Kempinski | G06F 3/012 715/765 |
| 2015/0355709 A1 | 12/2015 | Lee et al. | |
| 2016/0057412 A1* | 2/2016 | Lee | H04N 13/128 348/51 |
| 2017/0036111 A1 | 2/2017 | Shigeta et al. | |
| 2017/0155884 A1 | 6/2017 | Gronholm et al. | |
| 2017/0243324 A1* | 8/2017 | Mierle | G06T 19/006 |
| 2017/0323479 A1* | 11/2017 | Mokuya | G06T 19/003 |
| 2019/0057542 A1* | 2/2019 | Bronder | G06F 3/012 |

FOREIGN PATENT DOCUMENTS

| | | |
|---|---|---|
| JP | 2011-176397 A | 9/2011 |
| JP | 2017-208809 A | 11/2017 |
| KR | 10-2014-0067575 A | 6/2014 |
| KR | 10-2014-0129654 A | 11/2014 |
| KR | 10-2015-0034449 A | 4/2015 |
| KR | 10-2015-0141461 A | 12/2015 |
| KR | 10-2016-0147735 A | 12/2016 |
| WO | 2015190650 A1 | 12/2015 |

OTHER PUBLICATIONS

International Search Report (PCT/ISA/210) dated Jun. 24, 2019, issued by International Searching Authority in counterpart International Application No. PCT/KR2019/003234.

* cited by examiner (a)  (b)

(a)                              (b)

WEARABLE DISPLAY APPARATUS AND METHOD OF DISPLAYING THREE-DIMENSIONAL IMAGES THEREON

CROSS-REFERENCE TO RELATED APPLICATION

This application is based on and claims priority under 35 U.S.C. § 119 to Korean Patent Application No. 10-2018-0041164, filed on Apr. 9, 2018, in the Korean Intellectual Property Office, the disclosure of which is incorporated by reference herein in its entirety.

BACKGROUND

1. Field

Devices and methods consistent with the disclosure relate to a wearable display apparatus and a three-dimensional (3D) image display method, and more particularly, to a wearable display apparatus capable of displaying virtual reality (VR) contents and a controlling method thereof.

2. Description of the Related Art

Generally, a display apparatus is an apparatus for visually displaying received or stored image information to a user, and used in various places such as at home or a workplace. Examples of such a display apparatus include a monitor device connected to a personal computer or a server computer, a portable computer device, a navigation terminal device, a general television device, an Internet Protocol Television (IPTV) device, a portable terminal device such as a smartphone, a tablet PC, a personal digital assistant (PDA), a cellular phone, various display devices used for reproducing images such as advertisements or movies in the industrial field, or various types of audio/video systems.

The display apparatus also receives contents from various content sources such as a broadcasting station, an Internet server, a video playback device, a game device and/or a portable terminal. Also, the display apparatus restores (or decodes) images and sounds from the encoded audio and video data and outputs the restored images and sounds.

Recently, wearable display apparatuses worn by users have been studied. Representative examples of the wearable display apparatuses include a HMD (head mount display) in which a display apparatus is associated with a user's view.

Alongside research on such wearable display apparatuses, research on virtual reality contents such as a three-dimensional (3D) image for providing virtual reality to a user, a 360-degree virtual reality (VR) image, and a 360-degree VR 3D image has been ongoing.

SUMMARY

When contents such as games or movies are provided through a wearable display apparatus using the virtual reality (VR) technology, of the wearable device provides a sense of immersion to the user. In general, when a user views contents by using a display apparatus such as a TV, the user's head or both eyes would not move beyond the range of the display apparatus. However, when using a wearable display apparatus, a user often more actively moves the head or both eyes. Accordingly, both of the user's eyes may not be consistently horizontal to the ground surface, and thus the user may become disoriented.

In general, a 360-degree VR three-dimensional (3D) image may be generated by using a plurality of images captured by a camera being horizontal to the ground surface. In this case, users who view the 360-degree VR 3D image may experience an optimal VR effect or feel comfortable when both of the user's eyes are horizontal to the ground surface. However, if a user shakes or tilts their head, so that both of the user's eyes are not horizontal to the ground surface, the user may not recognize objects of an image well enough. For example, the user may see one object in two, or even worse, the user may experience physical pain such as headache or dizziness.

Accordingly, there is a need for securing visibility to cause a user who views a 3D image to easily recognize an image and comfortably appreciate the image. The embodiment disclosed herein provides a wearable display apparatus for securing visibility of a user and a 3D image display method thereof.

In accordance with an aspect of the disclosure, there is provided a wearable display apparatus, including a content receiver, a display, a sensor comprising circuitry, and a processor configured to obtain 3D image data including a plurality of images through the content receiver, based on a motion of the wearable display apparatus being sensed by the sensor, generate a first VR 3D image corresponding to a motion in which a roll component is excluded among directional components of the motion by processing the obtained 3D image data, and control the display to display the generated first VR 3D image.

In accordance with an aspect of the disclosure, there is provided a method for displaying a 3D image of a wearable display apparatus, the method including obtaining 3D image data, based on a motion of the wearable display apparatus being sensed, generating a first VR 3D image corresponding to a motion in which a roll component among directional components of the motion is excluded by processing the obtained 3D image data, and displaying the generated first VR 3D image.

In accordance with an aspect of the disclosure, there is provided a computer program product storing a computer readable recording medium, which includes at least one command that causes a computer to perform operations, wherein the operations include obtaining 3D image data, based on a motion of a wearable display apparatus in which a roll component is included being sensed, generating a first VR 3D image corresponding to a motion in which the roll component is excluded by processing the obtained 3D image data, and displaying a first VR 3D image corresponding to the motion in which the roll component is excluded.

According to embodiments of the disclosure, visibility of a user who views a 360-degree VR 3D image may be significantly improved. For example, fatigue or inconvenience that a user may feel while viewing a 3D image may be reduced, and the user may be more satisfied with a wearable display apparatus.

Particularly, when a user tilts their head, as a predetermined time passes, a 3D image may be gradually rotated, and a natural sense of dimension may be added to an object to be displayed. Accordingly, a problem of cognitive dissonance that a user feels when viewing an object may be solved, and a user who views a 3D image may keep feeling a balanced sense of immersion. As such, an optimal viewing environment may be provided.

According to an aspect of the disclosure, a wearable display apparatus includes a display; a sensor configured to detect motion of the wearable display apparatus and output motion data corresponding to the motion of the wearable display apparatus, the output motion data including a non-zero roll component; and a processor configured to obtain three-dimensional (3D) image data, obtain the output motion data from the sensor, generate a first virtual reality (VR) 3D image based on the obtained 3D image data and a portion of the obtained motion data excluding the non-zero roll component, and control the display to display the generated first VR 3D image.

The processor may be further configured to generate a second VR 3D image based on the obtained motion data including the non-zero roll component, control the display to display the generated second VR 3D image, and control the display to display the first VR 3D image in replacement of the second VR 3D image after a predetermined time period.

The processor may be further configured to generate a second VR 3D image based on the obtained motion data including the non-zero roll component, control the display to display the generated second VR 3D image, and control the display to gradually display the first VR 3D image in replacement of the second VR 3D image over a predetermined time period.

The wearable display apparatus may further include a speaker, and the processor may be further configured to control the speaker to output sounds at a first position while the second VR 3D image is displayed, and control the speaker to output sounds at the first position while the first VR 3D image is displayed.

The processor may be further configured to control the display to display a third VR 3D image corresponding to a field of view of a user, and control the display to display the third VR 3D image as the first VR 3D image in response to the sensor detecting the motion of the wearable display apparatus while the third VR 3D image is displayed.

The processor may be further configured to, based on a value of the non-zero roll component being equal to or greater than a predetermined value, control the display to display the third VR 3D image as a two-dimensional image.

The processor may be configured to generate the first VR 3D image by using information regarding a field of view of a user, and the information regarding the field of view of the user may include at least one from among information obtained based on positions of pupils of the user, and information obtained based on a posture of the wearable display apparatus.

The 3D image data may include a left-eye image and a right-eye image captured at positions separated in a horizontal direction parallel to a ground surface.

The 3D image data may include data corresponding to a 360-degree VR 3D image, or data corresponding to a field of view of a user.

According to an aspect of the disclosure, a method for displaying a three-dimensional (3D) image of a wearable display apparatus includes obtaining 3D image data; obtaining motion data corresponding to a motion of the wearable display apparatus sensed by a sensor, the obtained motion data including a non-zero component; generating a first virtual reality (VR) 3D image based on the obtained 3D image data and a portion of the obtained motion data excluding the non-zero roll component; and displaying the generated first VR 3D image.

The method may further include generating a second VR 3D image based on the obtained motion data including the non-zero roll component; displaying the generated second VR 3D image; and displaying the first VR 3D image in replacement of the second VR 3D image after a predetermined time period.

The method may further include generating a second VR 3D image based on the obtained motion data including the non-zero roll component; displaying the generated second VR 3D image; and gradually displaying the first VR 3D image in replacement of the second VR 3D image over a predetermined time period.

The method may further include outputting sounds at a first position while the second VR 3D image is displayed; and outputting sounds at the first position while the first VR 3D image is displayed.

The method may further include displaying a third VR 3D image corresponding to a field of view of a user; and displaying the third VR 3D image as the first VR 3D image in response to detecting the motion of the wearable display apparatus while the third VR 3D image is displayed.

The displaying of the third VR 3D image may include, based on a value of the non-zero roll component being equal to or greater than a predetermined value, displaying the third VR 3D image as a two-dimensional image.

The generating of the first VR 3D image may include generating the first VR 3D image by using information regarding a field of view of a user, and the information regarding the field of view of the user may include at least one from among information obtained based on positions of pupils of the user and information obtained based on a posture of the wearable display apparatus.

The 3D image data may include a left-eye image and a right-eye image captured at positions separated in a horizontal direction parallel to a ground surface.

The 3D image data may include data corresponding to a 360-degree VR 3D image or data corresponding to a field of view of a user.

According to an aspect of the disclosure, a computer readable recording medium includes computer-readable code that when executed by a wearable display apparatus causes the wearable display apparatus to execute a method for displaying a three-dimensional (3D) image, the method including obtaining 3D image data; obtaining motion data corresponding to a motion of the wearable display apparatus sensed by a sensor, the obtained motion data including a non-zero component; generating a first virtual reality (VR) 3D image based on the obtained 3D image data and a portion of the obtained motion data excluding the non-zero roll component; and displaying the generated first VR 3D image.

The method may further include generating a second VR 3D image based on the obtained motion data including the non-zero roll component; displaying the generated second VR 3D image; and displaying the first VR 3D image in replacement of the second VR 3D image.

According to an aspect of the disclosure, a wearable display apparatus includes a sensor configured to sense a motion of the wearable display apparatus including a non-zero left or right tilt; a display configured to display a three-dimensional (3D) image; and a processor configured to receive image data and motion data corresponding to the motion of the wearable display apparatus and generate a 3D image for display by the display based on the received image data and the received motion data.

The processor may be configured to generate the 3D image based on the received motion data excluding the non-zero left or right tilt.

The processor may be configured to generate the 3D image based on the received motion data including the non-zero left or right tilt, the 3D image being rotated left or right by an angle based on the non-zero left or right tilt of the wearable display apparatus sensed by the sensor.

The processor may be further configured to gradually reduce the angle of the rotated 3D image to display an unrotated 3D image after a predetermined time period has elapsed from a time at which the motion of the wearable apparatus is sensed.

The processor may be further configured to gradually reduce the angle of the rotated 3D image to display an unrotated 3D image at the same time as the rotational movement is sensed.

The processor may be further configured to, in response to the angle of the rotated 3D image being greater than a predetermined value, generate a two-dimensional (2D) image corresponding to the rotated 3D image, the 2D image being rotated left or right by the angle of the rotated 3D image, and cause the display to display the rotated 2D image instead of the rotated 3D image.

The wearable display apparatus may be configured to be worn on a head of a user, and the sensed motion of the wearable display apparatus may correspond to a tilting of the head of the user.

The wearable display apparatus may further comprising a 3D speaker, wherein the processor is further configured to receive 3D sound data and cause the 3D speaker to output a sound corresponding to the 3D sound data, and wherein a direction of the output sound is independent of the angle of the rotated 3D image.

The wearable display apparatus may further include a 3D speaker, wherein the processor is further configured to receive 3D sound data and cause the 3D speaker to output a sound corresponding to the 3D sound data, and wherein a direction of the output sound is independent of the tilting of the head of the user.

DETAILED DESCRIPTION OF EMBODIMENTS

Figure 1:
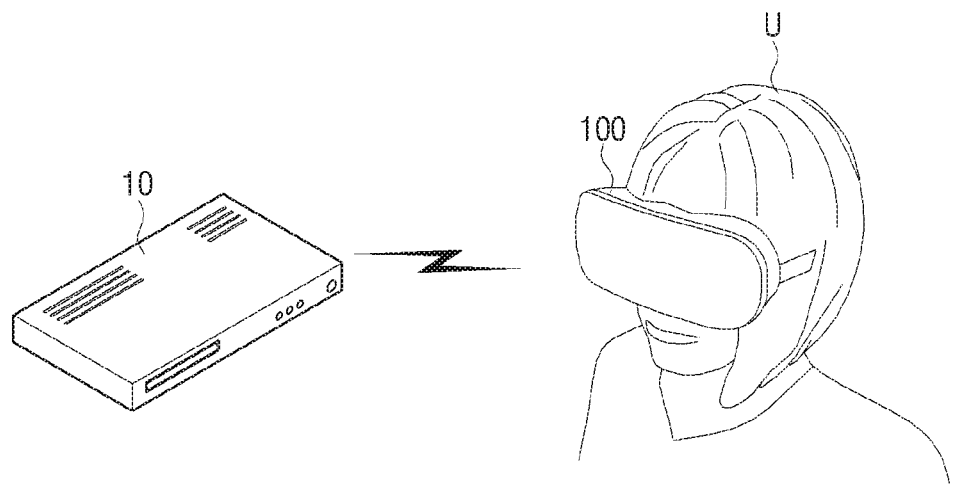
FIG. 1 is a view illustrating a wearable display apparatus and a content source according to an embodiment.

The embodiments of the disclosure may be diversely modified. Accordingly, specific embodiments are illustrated in the drawings and are described in detail in the detailed description. However, the disclosure is not limited to a specific embodiment, but includes all modifications, equivalents, and substitutions without departing from the scope and spirit of the disclosure. Also, well-known functions or constructions are not described in detail since they would obscure the disclosure with unnecessary detail.

Hereinafter, various embodiments of the disclosure will be described with reference to the accompanying drawings. It is to be understood that the scope of the disclosure herein is not intended to be limited to the specific embodiments but includes various modifications, equivalents, and/or alternatives of the embodiments. In the description of the drawings, like reference numerals refer to like elements throughout the description of drawings.

Figure 2:
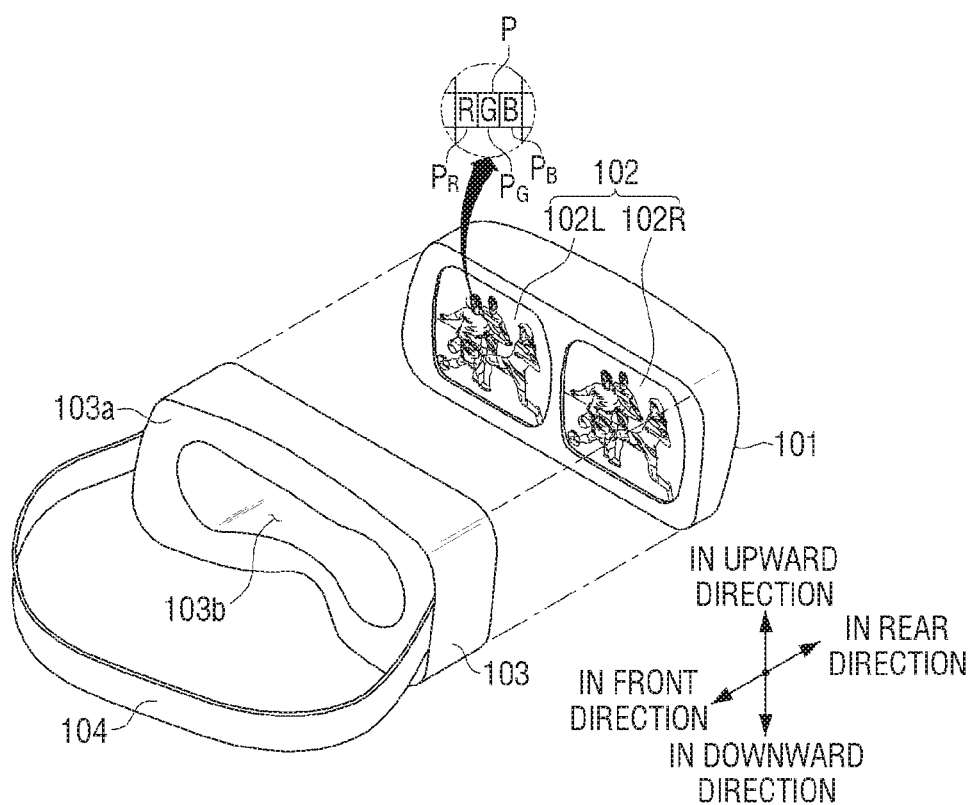
FIG. 2 is an exploded view illustrating a wearable display apparatus according to an embodiment.

FIG. 1 is a view illustrating a wearable display apparatus and a content source according to an embodiment of the disclosure, and FIG. 2 is an exploded view illustrating a wearable display apparatus according to an embodiment of the disclosure.

Referring to FIG. 1 and FIG. 2, a wearable display apparatus 100 may process image data received from an external source or image data stored in a storage medium embedded in the wearable display apparatus 100 and visually display the processed image. The wearable display apparatus 100 may be worn on the body of a user U and fixed to the body of the user U. For example, the wearable display apparatus 100 may be implemented in various product forms such as a head mount display (HMD), smart glasses or a smart helmet which is worn on the head or face of the user U.

Hereinafter, the head mounted display will be exemplified as the wearable display apparatus 100, but other types of the wearable display apparatus 100 can be used as long as they are worn on the user's body and visually reproduce image signals.

For example, referring to FIG. 1, the wearable display apparatus 100 may be connected to the content source 10 by a wire or wirelessly, and receive contents including video and audio from the content source 10. In addition, the wearable display apparatus 100 may output the video and audio included in the contents. For example, the wearable display apparatus 100 may receive television broadcasting contents from a broadcasting receiving device (e.g., a set-top box), multi-media contents from a content reproduction device, or streaming contents from a content streaming server through a network.

The wearable display apparatus 100 may receive virtual reality (VR) contents from a content source, and reproduce VR contents. The wearable display apparatus 100 may be worn on a user's body to reproduce at least one of three-dimensional (3D) images, 360-degree VR images, or 360-degree 3D images.

Referring to FIG. 2, the wearable display apparatus 100 may include a body 101 accommodating a plurality of components for displaying an image, a screen 102 provided on one surface of the body 101 and displaying an image, a mounting member 103 supporting the body 101 and mounted on the body of the user U, and a fixing member 104 for fixing the body 101 and the mounting member 103 to the body of the user U.

The body 101 may form the outer shape of the wearable display apparatus 100, and include a component therein for enabling the wearable display apparatus 100 to output images and sounds. FIG. 2 shows the body 101 in the shape of a flat substrate, but the shape of the body 101 is not limited thereto. The body 101 may have a curved shape in which the left and right ends protrude forward and the center portion is concave.

The screen 102 may be formed on the front surface of the body 101, and display images as visual information. For example, the screen 102 may display still images or videos, or a two-dimensional plane image, a 3D image, a 360-degree VR image, or a 360-degree VR 3D image. In the disclosure, a 3D image may include a stereoscopic image.

The screen 102 may include a right-eye screen 102R and a left-eye screen 102L for displaying 3D images. The right-eye screen 102R and the left-eye screen 102L may display images of the same object captured from different orientations (e.g., the user's left-eye and right-eye positions). In other words, the right-eye screen 102R and the left-eye screen 102L may display an image with the parallax difference between the user's eyes. The user U may feel a sense of three dimensions due to the difference between the image displayed on the right-eye screen 102R and the image displayed on the left-eye screen 102L.

The right-eye screen 102R and the left-eye screen 102L may be separately embodied. The right-eye screen 102R and the left-eye screen 102L may instead be embodied in a unitary manner as a single display panel.

A plurality of pixels P may be formed on the screen 102, and the image displayed on the screen 102 may be formed by combination of light emitted from the plurality of pixels P. For example, a single image may be formed on the screen 102 by combination of light emitted from the plurality of pixels P as a mosaic.

Each of the plurality of pixels P may emit light of varying brightness and various colors.

To emit light of varying brightness, each of the plurality of pixels P may include a configuration to directly emit light (e.g., an organic light emitting diode panel) or a configuration to transmit or block light emitted by a backlight unit (e.g., a liquid panel).

In order to emit light of various colors, each of the plurality of pixels P may include sub-pixels PR, PG and PB. The subpixels PR, PG and PB may include a red R subpixel PR for emitting red light, a green G subpixel PG for emitting green light, and a blue B subpixel PB for emitting blue light. For example, the red subpixel PR may emit red light at wavelengths of approximately 620 nm to 750 nm, the green subpixel PG may emit green light at wavelengths of approximately 495 nm to 570 nm, and the blue subpixel PB may emit blue light at wavelengths of approximately 450 nm to 495 nm.

By the combination of the red light of the red subpixel PR, the green light of the green subpixel PG and the blue light of the blue subpixel PB, each of the plurality of pixels P may emit light of varying brightness and various colors.

Referring to FIG. 2, the screen 102 is shown as having a flat substrate shape, but the shape of the screen 102 is not limited thereto. For example, the left and right ends of the screen 102 may protrude forward and the center portion may be curved to be concave.

The mounting member 103 may be mounted in the front surface of the body 101 and may fix the body 101 to the body of the user U.

The mounting member 103 may be provided between the body of the user U and the body 101 and mounted on the body of the user U.

The mounting member 103 may include a curve part 103A that is mounted on the body of the user U. The curve part 103A may be firmly attached to the body of the user U, for example, the user's face, and may be formed of a material having elasticity that capable of shrinking or expanding by an external force to maximize the area firmly attached to the body of the user U. For example, the shape of the curve part 103A may vary depending on the face shape of the user U when attached to the face of the user U, and be restored to its original form when separated from the face of the user U.

The mounting member 103 may block external light and limit the view of the user U (i.e., the field of view of the user) to the screen 102.

A hollow 103B may be formed at the center of the mounting member 103 so that the user U may view the screen 102. The user U may view the screen 102 through the hollow 103B of the mounting member 103. Therefore, the mounting member 103 may block external light and limit the view of the user U to the screen 102 to help the user U to focus on the screen 102.

The body 101 may be fixedly positioned with respect to the face of the user U because the mounting member 103 is mounted on the face of the user U. That is, the screen 102 may be formed on the front surface of the body 101 and may be disposed at a certain position with respect to the face of the user U even if the user U moves or shakes their head.

The fixing member 104 may be attached to the mounting member 103 and fix the body 101 and the mounting member 103 to the body of the user U.

The fixing member 104 may be formed in a belt shape, and both ends of the fixing member 104 may be attached to both ends of the mounting member 103. In addition, the fixing member 104 may be formed of a material having elasticity that can be capable of expanding or shrinking by an external force.

The mounting member 103 may be firmly attached to the face of the user U, and the fixing member 104 may surround the user's head. The mounting member 103 may be fixed to the face of the user U due to the elasticity of the fixing member 104.

The shape of the fixing member 104 is shown as having a belt shape shown in FIG. 2, but the shape thereof is not limited thereto as long as it can be fixed to the body of the user U.

As described above, the wearable display apparatus 100 may be fixed to the face of the user U, and positioned at a certain position with respect to the face of the user U. As a result, the screen 102 of the wearable display apparatus 100 may also be disposed at a certain position with respect to the face of the user U.

As a result, the wearable display apparatus 100 may be suitable for displaying VR images such as 3D images and/or 360-degree VR images. The wearable display apparatus 100 may display VR images in various other methods.

Figure 3:
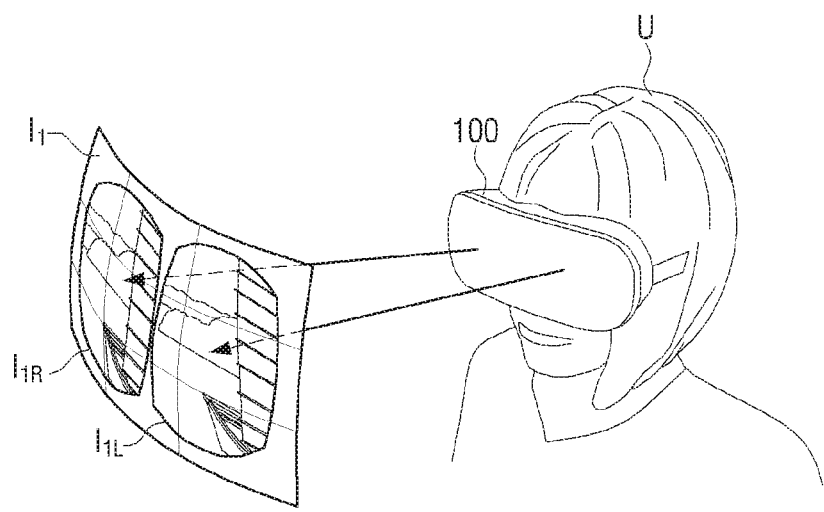
FIG. 3 is a view illustrating an embodiment of an image displayed on a wearable display apparatus according to an embodiment
Figure 4:
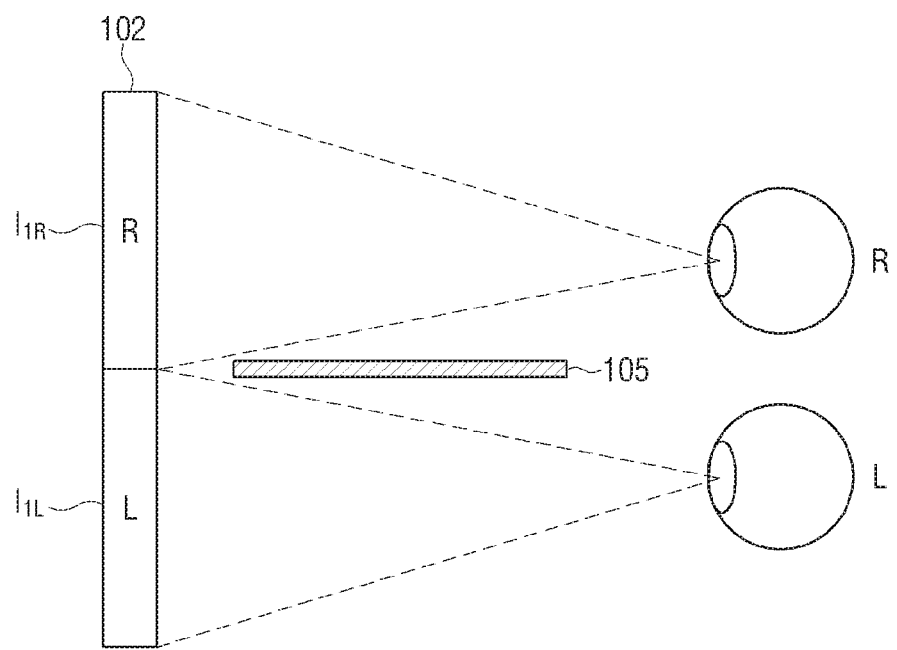
FIG. 4 is a view illustrating a three-dimensional (3D) image displayed on a wearable display apparatus according to an embodiment.

FIG. 3 is a view illustrating an embodiment of an image displayed on a wearable display apparatus according to an embodiment of the disclosure, and FIG. 4 is a view illustrating a 3D image displayed on a wearable display apparatus according to an embodiment of the disclosure. FIG. 3 shows an image I1 displayed on a wearable display apparatus 100 separately from the wearable display apparatus 100, but it is only for the sake of understanding. In other words, the image I1 may be displayed on the screen 102 of the wearable display apparatus 100, but not displayed outside the wearable display apparatus 100 as it appears in FIG. 3.

Referring to FIG. 3, the wearable display apparatus 100 may display, for example, a 3D binocular image I1.

The 3D binocular image I1 may include a left-eye image I1L and a right-eye image I1R. The left-eye image I1L and the right-eye image I1R may be spatially separated and displayed on screens 102R and 102L side by side.

Referring to FIG. 4, the left-eye image I1L displayed on the left-eye screen 102L may be seen from the left-eye of the user U and the right-eye image I1R displayed on the right-eye screen 102R may be seen from on the right-eye of the user U. In other words, the user U may respectively view different images I1L and I1R through the user's left and right eyes.

Further, the wearable display apparatus 100 may further include a partition wall 105 for partitioning the left-eye screen 102L and the right-eye screen 102R. The user U cannot view the left-eye image I1L displayed on the left-eye screen 102L through the user's right eye and likewise cannot view the right-eye image I1R displayed on the right-eye screen 102R through the user's left eye.

The wearable display apparatus 100 may respectively display the left-eye image I1L and the right-eye image I1R on the left-eye screen 102L and the right-eye screen 102R in a predetermined manner or sequence according to the format of the 3D image.

The left-eye image I1L and the right-eye image I1R may be different from or identical to each other. For example, the left-eye image I1L and the right-eye image I1R may be images obtained by photographing the same object at different positions (e.g., the user's left-eye and right-eye positions), respectively. In other words, the left-eye image I1L and the right-eye image I1R may be different as much as the parallax difference between the user's left and right eyes. The user U may view the left-eye image I1L with the left-eye and the right-eye image I1R with the right-eye. Due to the difference between the left-eye image I1L and the right-eye image I1R, the user U may experience a 3D effect.

As described above, the wearable display apparatus 100 may display the 3D binocular image I1 in which the left-eye image I1L and the right-eye image I1R are spatially separated on the screen 102, and the user U may experience a 3D effect with the left-eye image I1L and the right-eye image I1R.

Figure 5:
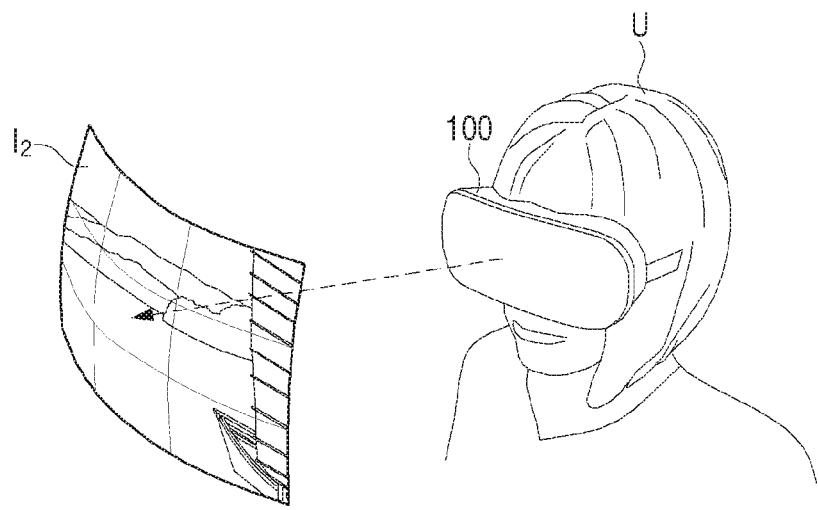
FIG. 5 is a view illustrating another embodiment of an image displayed on a wearable display apparatus according to an embodiment.
Figure 6:
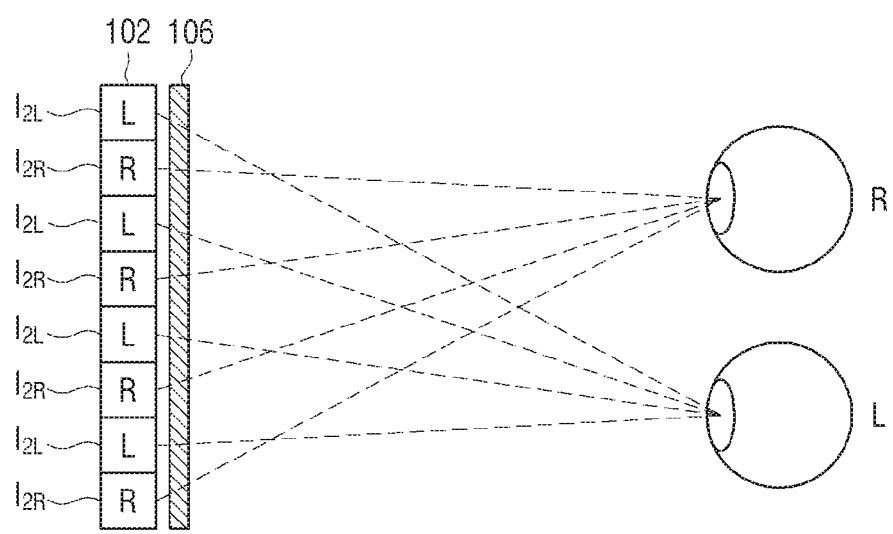
FIG. 6 is a view illustrating another embodiment of a 3D image displayed on a wearable display apparatus according to an embodiment.

FIG. 5 is a view illustrating another embodiment of an image displayed on a wearable display apparatus according to an embodiment of the disclosure, and FIG. 6 is a view illustrating another embodiment of a 3D image displayed on a wearable display apparatus according to an embodiment of the disclosure. FIG. 5 shows a wearable display apparatus 100 and an image I2 displayed on the wearable display apparatus 100 separately, but this is for the sake of understanding. In other words, the image I2 may be displayed on a screen 102 of the wearable display apparatus 100, but not be displayed outside the wearable display apparatus 100 as it appears in FIG. 5.

Referring to FIG. 5, the wearable display apparatus 100 may display a single 3D image I2.

The single 3D image I2 may not include the left-eye image and the right-eye image which are arranged side by side, unlike the 3D binocular image I1 shown in FIG. 3. In other words, the single 3D image I2 may produce a 3D effect by itself.

The single 3D image I2 may include the left-eye image I2L and the right-eye image I2R alternately distributed on different lines of the display. For example, the left-eye image I2L may be displayed in an odd column of the single 3D image I2, and the right-eye image I2R may be displayed in an even column of the single 3D image I2.

In addition, according to an embodiment, the single 3D image I2 may include the left-eye image I2L and the right-eye image I2R alternately displayed according to a frame. For example, the left-eye image I2L may be displayed in a first frame, and the right-eye image I2R may be displayed in a second frame.

The left-eye image I2L of the single 3D image I2 may be seen from the left-eye of the user U, and the right-eye image I2R of the single 3D image I2 may be seen from the right-eye of the user U.

Referring to 6, in order to display a 3D image using the single 3D image I2, the wearable display device 100 may include an optical member 106 attached to or provided close to the screen 102.

The screen 102 may alternately display a belt-shaped left-eye image portion I2L and a belt-shaped right-eye image portion I2R in parallel with each other.

The optical member 106 may have any one or more of various optical structures to separate the left-eye image portion I2L from the right-eye image portion I2R.

For example, the optical member 106 may comprise a polarizing film. The polarizing film may include a plurality of first left-eye polarizing films and a plurality of first right-eye polarizing films arranged in parallel. The first left-eye polarizing film may be disposed at a position corresponding to the left-eye image portion I2L and the first right-eye polarizing film may be disposed at a position corresponding to the right-eye image portion I2R. The wearable display apparatus 100 may further include a second left-eye polarizing film provided at a position corresponding to the left-eye of the user U and a second right-eye polarizing film provided at a position corresponding to the right-eye of the user U. The user U may view the left-eye image portion I2L that has passed through the first and second left-eye polarizing films using the left eye, and may view the right-eye image portion 12R that has passed through the first and second right-eye polarizing films using the right eye.

For another example, the optical member 106 may include a lenticular lens. The lenticular lens may be provided on the front surface of the screen 102. The lenticular lens may include a plurality of semicircular pillars convex toward the opposite side of the screen 102. The plurality of semicircular pillars may be disposed at positions corresponding to the left-eye image portion I2L and the right-eye image portion I2R. The light forming the left-eye image I2L and the light forming the right-eye image I2R may be refracted in different directions by the semicircular pillars.

For example, the light forming the left-eye image I2L may be refracted toward the left eye of the user U by the left convex surface of the semicircular pillars, and the light forming the right-eye image I2R may be refracted toward the right eye of the user U by the right convex surface of the semicircular pillars. As a result, the user U may view the left-eye image I2L passing through the left convex surface of the semicircular pillars using the left eye, and may view the right-eye image I2R passing through the right convex surface of the semicircular pillars using the right eye.

For another example, the optical member 106 may include a parallax barrier. The parallax barrier may include a plurality of light blocking barriers and a plurality of slots arranged in parallel with each other. Light forming the left-eye image I2L and light forming the right-eye image I2R may pass through the slot. Light directed to the left eye of the user U among the light forming the left-eye image I2L may pass through the slot, and light traveling in another direction may be blocked by the light blocking barrier. In addition, among the light forming the right-eye image I2R, light directed toward the right eye of the user U may pass through the slot, and light traveling in another direction may be blocked by the light blocking barrier. As a result, the user U may view the left-eye image I2L passing through the slot using the left eye, and the right-eye image I2R passing through the slot using the right eye.

In the same manner, the wearable display apparatus 100 may provide the user U with a 3D effect by using the parallax difference between two points of the left-eye image I2L and the right-eye image I2R.

As described above, the wearable display apparatus 100 may display the left-eye image I1L and the right-eye image I1R or display a part of the left-eye image I2L and a part of the right-eye image I2L alternately in order to display a 3D image.

Figure 7:
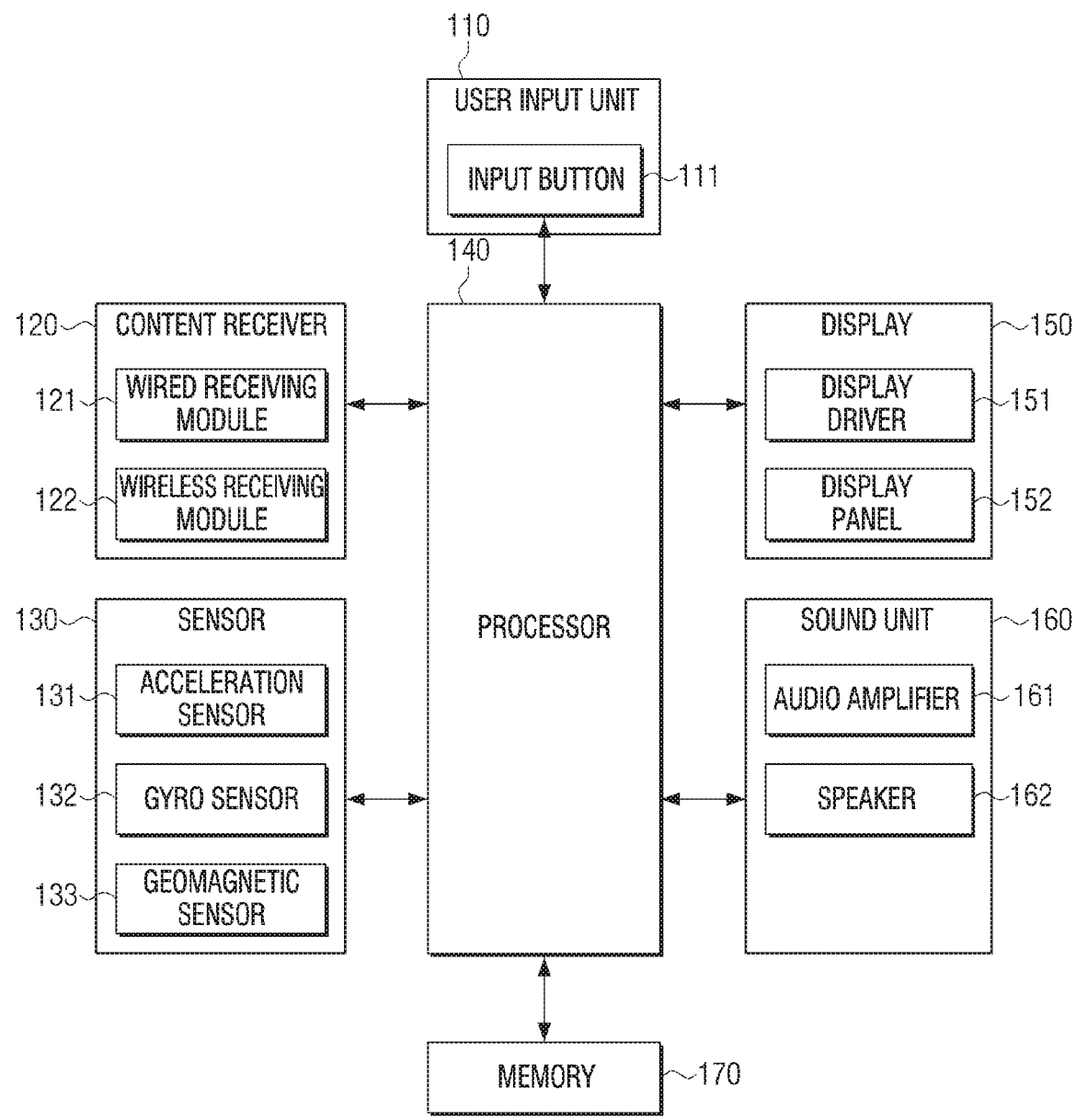
FIG. 7 is a view illustrating configuration of a wearable display apparatus according to an embodiment.

FIG. 7 is a view illustrating a configuration of a wearable display apparatus according to an embodiment of the disclosure A wearable display apparatus 100 may include a user input unit 110 for receiving a user input from a user, a content receiver 120 (i.e., content receiving device) for receiving contents from a content source 10, a sensor (i.e., a sensing unit) 130 for sensing the posture of the wearable display apparatus 100, a processor 140 for processing contents received at the content receiver 120 and contents stored in a memory 170, a display 150 for displaying an image processed by the processor 140, and a sound unit 160 for outputting sounds processed by the processor 140.

For various embodiments, the display apparatus 100 may necessarily include the sensor 130, the processor 140, and the display 150, and optionally include at least one of the user unit input 110, the content receiver 120, the sound unit 160 and the memory 170.

The user input unit 110 may include an input button 111 for receiving a user input. For example, the user input unit 110 may include a power button for turning on or turning off the wearable display apparatus 100, a source selection button for selecting the content source 10, a sound control button for adjusting a volume of sound output from the wearable display apparatus 100, etc.

The input button 111 may receive a user input, and output an electrical signal corresponding to the user input to the processor 140, and may be embodied as various input means such as push switch, touch switch, dial, slide switch, toggle switch, etc.

The content receiver 120 may include a wired receiving module 121 for receiving contents from the content source 10 in a wired manner, and a wireless receiving module 122 for receiving contents from the content source 10 in a wireless manner.

The wired receiving module 121 may receive contents from the content source 10 through various types of image transmission cables.

For example, the wired receiving module 121 may receive contents from the content source 10 through a component (YPbPr/RGB) cable, a composite (composite video blanking and sync (CVBS)) cable, a High Definition Multimedia Interface (HDMI) cable, a universal serial bus (USB) cable, an Ethernet (IEEE 802.3 technology standard) cable, or the like.

When receiving contents from the content source 10 through the wired receiving module 121, the wearable display apparatus 100 may receive image frame data from the content source 10. The image frame data may be a bit stream indicating an image of one frame, for example, non-compressed image data.

The wired receiving module 121 may receive image data through an image transmission cable, and thus a data transmission rate thereof is not significantly limited. Therefore, the wired receiving module 121 may receive image frame data from the content source 10 as it is.

The wireless receiving module 122 may receive contents from the content source 10 by using various wireless communication standards.

For example, the wireless receiving module 122 may receive contents from the content source 10 wirelessly by using WiFi™ (EEE 802.11 technology standard), Bluetooth™ (IEEE 802.15.1 technology standard) or ZigBee™ (IEEE 802.15.4 technology standard). The wireless receiving module 122 may receive contents from the content source wirelessly by using CDMA, WCDMA, GSM, Long Term Evolution (LTE), WiBro, or the like.

When receiving contents from the content source 10 through the wireless receiving module 122, the wearable display apparatus 100 may receive compressed/encoded image data from the content source 10. The compressed/encoded image data may represent a bit stream in which an image of one frame or an image of a plurality of frames is compressed or encoded. For example, the image frame data may be compressed or encoded by an image compression standard such as H.264/MPEG-4 AVC (moving picture experts group-4 advance video coding) or H.265/HEVC (high efficiency video coding). By compressing or encoding the image frame data, the compressed/encoded image data may have a smaller capacity (or size) than the original image frame data.

The wireless receiving module 122 may receive image data wirelessly, and thus a data transmission rate is limited. Therefore, the wireless receiving module 122 may receive the compressed/encoded image data from the content source 10.

The content receiver 120 may receive contents from the content source 10 by wire or wirelessly, and output the received contents to the processor 140.

The sensor 130 may sense the motion and the posture of the wearable display apparatus 100 in three dimensions. For example, the sensor 130 may detect a linear movement acceleration, a linear movement speed, a linear movement displacement, a linear movement direction, a tilt, a rotational angular speed, a rotational angular displacement, and/or a rotational direction (an axial direction of the rotational movement) of the wearable display apparatus 100 fixed to the body of the user U while the user U is moving.

The sensor 130 may include an acceleration sensor 131 for sensing linear movement of the wearable display apparatus 100, a gyro sensor 132 for sensing rotation of the wearable display apparatus 100, a magnetic sensor 133 for sensing earth magnetic field, and the like.

The acceleration sensor 131 may measure an x-axis acceleration, a y-axis acceleration, and/or a z-axis acceleration (three-axis linear acceleration) due to the linear movement of the wearable display apparatus 100.

For example, the acceleration sensor 131 may measure the linear movement acceleration of the wearable display apparatus 100 based on the acceleration (gravity acceleration) caused by the earth's gravity. The acceleration sensor 131 may measure the vector sum of the gravitational acceleration and the linear movement acceleration and identify the linear movement acceleration from the measured value. The acceleration sensor 131 may calculate the linear movement speed of the wearable display apparatus 100 from the linear movement acceleration speed of the wearable display apparatus 100, and may calculate the linear movement speed of the wearable display apparatus 100 from the previous movement speed of the wearable display apparatus 100.

The acceleration sensor 131 may identify the posture of the wearable display apparatus 100 based on the sensed change in the direction of gravity acceleration.

The gyro sensor 132 may measure the angular speed around the x axis, the angular speed around the y axis, and/or the angular speed around the z axis (three axis angular speed) due to the rotational movement of the wearable display apparatus 100.

For example, the gyro sensor 132 may measure the rotational angular speed of the wearable display apparatus 100 using the Coriolis force due to rotation. The gyro sensor 122 may measure the Coriolis force and calculate the rotational angular speed of the wearable display apparatus 100 from the Coriolis force.

The gyro sensor 132 may calculate the rotational movement displacement of the wearable display apparatus 100 from the rotational angular speed of the wearable display apparatus 100.

The geomagnetic sensor 133 may measure an x-axis directional component, a y-axis directional component, and a z-axis directional component of the earth magnetic field passing through the wearable display apparatus 100.

For example, the geomagnetic sensor 133 may measure a geomagnetic field passing through the wearable display apparatus 100 using a Hall effect. The Hall effect refers to the electromotive force that is generated in a direction perpendicular to a current and a magnetic field when a magnetic field is formed perpendicular to a current in a semiconductor through which the current flows. The geomagnetism sensor 133 may measure the electromotive force caused by the Hall effect and calculate the geomagnetic field from the electromotive force by the Hall effect.

In particular, the geomagnetic sensor 133 may calculate the orientation of the wearable display apparatus 100, that is, the posture of the wearable display apparatus 100.

The sensor 130 may output information on the motion such as the linear movement acceleration, the linear movement velocity, the linear movement displacement, the linear movement direction, the rotational angular speed, the rotational angular displacement, and/or the rotational direction (e.g., the axial direction of the rotational movement) of the wearable display apparatus 100, and information on the posture such as the inclination of the wearable display apparatus 100 to the processor 140.

The processor 140 may control the content receiver 120, the sensor 130, the display 150 and/or the sound unit 160 according to a user input received through the user input unit 110. For example, when a user input is received for selecting the content source 10, the processor 140 may control the content receiver 120 to receive content data from the selected content source. In addition, when a user input for adjusting images and/or sounds is received, the processor 140 may control the display 150 and/or the sound unit 160 to adjust images and/or sounds.

The processor 140 may obtain image data from the content receiver 120, and process the obtained image data.

The processor 140 may obtain image data from the memory 170 and process the obtained image data. For example, the processor 140 may restore image frame data by decoding the compressed/encoded image data. To be specific, the image decoder 220 may decode the compressed/encoded image data by using an image compression standard such as H.264/MPEG-4 AVC or H.265/HEVC.

The processor 140 may perform rendering of a 3D image by processing the restored image frame data. To be specific, the processor 140 may process an image frame including a left-eye image and a right-eye image so that a user may feel a sense of three dimensions according to a 3D image display method of the wearable display apparatus 100. For example, the wearable display apparatus 100 may display a binocular 3D image as shown in FIG. 3. In this case, a 3D image renderer may separate a 3D image into a left-eye image and a right-eye image to perform rendering of the 3D image, and align the left-eye image and the right-eye image in parallel. The wearable display apparatus 100 may instead display a single 3D image as shown in FIG. 5. In this case, the processor 140 may divide a right-eye image and a left-eye image into a plurality of left-eye image portions and a plurality of right-eye image portions in a belt shape, and alternately arrange the plurality of left-eye image portions and the plurality of right-eye image portions to generate a 3D image.

The image frame of the 3D image decoded by the processor 140 may have various formats, and the processor 140 may perform rending of a 3D image from an image frame according to a format of the image frame using different methods.

The processor 140 may output all or part of the 3D image to the display 150 according to a value sensed by the sensor 130.

The memory 170 may store programs or data for controlling configurations included in the wearable display apparatus 100, and memorize temporary control data that occurs while the configurations included in the wearable display apparatus 100 are controlled.

The memory 170 may store programs and data for decoding the image data received at the content receiver 120, and programs and data for reproducing a 3D image from the decoded image data. The memory 170 may store temporary image data that occurs while image data is decoded or a 3D image is rendered.

The memory 170 may include a non-volatile memory such as a read only memory and a flash memory for storing data for a long term, and a volatile memory such as an S-RAM (Static Random Access Memory), a D-RAM (Dynamic Random Access Memory), and the like for temporarily storing data. The memory 170 may also include an external memory. The external memory may include, for example, a compact flash (CF), a secure digital (SD), a micro-SD, a mini-SD, an extreme digital (xD), a multimedia card (MMC), or a memory stick. The external memory may be functionally or physically connected to the wearable display apparatus 100 through various interfaces. In addition, the external memory may be detachable from the wearable display apparatus 100.

The processor 140 may generate a control signal for controlling the content receiver 120, the sensor 130, the display 150 and/or the sound unit 160 based on a user input from the user input unit 110. The processor 140 may obtain image data from the content receiver 120 or the memory 170, decode image data according to programs and data stored in the memory 170, and render a 3D image.

The processor 140 may include an arithmetic circuit for performing logical and arithmetic operations, a storage circuit for storing arithmetic data, and the like.

The operation of the processor 140 will be described in further detail below.

The display 150 may include a display panel 152 visually displaying an image and a display driver 151 for driving the display panel 152.

The display panel 152 may include a pixel as a unit for displaying an image. Each pixel may receive an electrical signal for displaying an image from the display driver 151, and output an optical signal corresponding to the received electrical signal. A single image may be displayed on the display panel 152 by combining optical signals output from the plurality of pixels.

For example, the plurality of pixels may be provided on the display panel 152, and images displayed on the display panel 152 may be formed by combination of light emitted from the plurality of pixels. For example, a single image may be formed on the display panel 152 by combining light emitted from the plurality of pixels in a mosaic shape. As described above, each of the plurality of pixels may emit light of varying brightness and colors, and each of the plurality of pixels may include a red sub-pixel, a green sub-pixel, and a blue sub-pixel to emit light of various colors.

The display panel 152 may be embodied as various types of panels such as a liquid crystal display panel (LCD panel), a light emitting diode panel (LED panel), or an organic light emitting diode panel (OLED panel), and the like.

According to an embodiment, the display panel 152 may be divided into a plurality of areas. For example, the display panel 152 may be divided into a left area for displaying a left image and a right area for displaying a right image. The left area of the display panel 152 may form a left-eye screen 102L, and the right area of the display panel 152 may form a right-eye screen 102R.

According to an embodiment, the display 150 may include a plurality of display panels. For example, the display 150 may include a left-side display panel for displaying a left-eye image, and a right-side display panel for displaying a right-eye image. The left-side display panel may form the left-eye screen 102L, and the right-eye display panel may form the right-eye screen 102R.

The display driver 151 may receive image data from the processor 140 and drive the display panel 152 to display an image corresponding to the received image data. To be specific, the display driver 151 may transmit electrical signals corresponding to image data to a plurality of respective pixels constituting the display panel 152.

The display driver 151 may transmit electrical signals corresponding to image data to the respective pixels constituting the display panel 152, and then each pixel may emit light corresponding to the received electrical signal, and form a single image by combining light emitted from each pixel.

The sound unit 160 may include an audio amplifier 161 for amplifying sounds, and a speaker 162 for outputting the amplified sounds. The sound unit 160 may optionally further include a microphone (not shown).

The processor 140 may process sound data and convert the sound data into sound signals, and the audio amplifier 161 may amplify sounds signals output from the processor 140.

The speaker 162 may convert the sound signals amplified by the audio amplifier 161 into sounds (sound waves). For example, the speaker 162 may include a thin film vibrating according to an electrical sound signal, and generate a sound wave caused by vibration of the thin film.

The microphone may collect sounds near the display apparatus 100 and convert the collected sounds into electrical sound signals. The sound signals collected by the microphone may be output to the processor 140.

As described above, the wearable display apparatus 100 may obtain image data from the content source 10 or the memory 170 and render a 3D image from the image data.

For various embodiments, the processor 140 may obtain image data including a left-eye image and a right-eye image. For example, the wearable display apparatus 100 may obtain the image data from the content source 10, or the memory 170. The image data may encoded image data for generating a 360-degree VR 3D image, or encoded image data for generating a VR 3D image corresponding to user's view (i.e., field of view) among the 360-degree VR 3D images.

The processor 140 may process the obtained image data, and control the display 150 to display a first VR 3D image (i.e., an unrotated 3D image) corresponding to the user's view among 360-degree VR 3D images.

If a user tilts her/his head, the sensor 130 may sense the motion (i.e., rotational movement) of the wearable display apparatus 100. Based on the degree of tilt of the wearable display apparatus 100 sensed by the sensor 130, the processor 140 may control the display 150 to display a second 3D image (i.e., a rotated 3D image) corresponding to the changed user's view. The processor 140 may then control the display 150 such that the second 3D image gradually rotates while being displayed up to the angle corresponding to the degree of tilt.

Before the user tilts their head, an image horizontal plane, which is a horizontal reference of the first VR 3D image, may be parallel to a binocular horizontal plane which may be the horizontal reference of the user's eyes. After the user tilts the head but before the second VR 3D image has been rotated, an intersection angle between the image horizontal plane, which is the horizontal reference of the second VR 3D image, and the binocular horizontal plane may correspond to the degree of tilt of the wearable display apparatus 100 sensed by the sensor 130 as the user tilts the head. In addition, the image horizontal plane after the second VR 3D image has been rotated may be parallel to the binocular horizontal plane, which is the horizontal reference of the user's eyes.

For various embodiments, the processor 140 may control the display 150 such that the second 3D image gradually rotates while being displayed. For example, the processor 140 may control the display 150 such that the second 3D image gradually rotates while being displayed after a preset time passes from a time when the user's head has tilted. Alternatively, the processor 140 may control the display 150 such that the second 3D image gradually rotates while being displayed and as the user is tilting the head.

For various embodiments, when the first VR 3D image is displayed, the processor 140 may control the display 150 to display the left and right surface sides of the object, and when the second VR 3D image is displayed, control the display 150 to display the upper left side surface corresponding to the left side surface of the object and the lower right side surface corresponding to the right side surface of the object.

For various embodiments, the processor 140 may control the display 150 such that the second 3D image gradually rotates while being displayed when the degree of tilt of the wearable display apparatus 100 is smaller than a predetermined value, and may control the display 150 such that the second VR 3D image is displayed as a 2D image when the degree of tilt of the wearable display apparatus 100 is equal to or greater than the predetermined value.

For various embodiments, the processor 140 may control the speaker 162 to output sound associated with the second VR 3D image at the first location while the second VR 3D image is displayed. The processor 140 may also control the speaker 162 to output sound corresponding to the rotated second VR 3D image at the position same as or approximate to the first position while the rotated second VR 3D image is displayed.

For various embodiments, the processor 140 may acquire image data from the content source 10 located externally, which is connected wirelessly or by wire, or acquire image data from the memory 170 of the wearable display apparatus 100. In this case, the image data may include image data for generating a 360-degree VR 3D image, or encoded image data for generating a VR 3D image corresponding to a user's view among the 360-degree VR 3D images.

For various embodiments, when the display 150 includes a left-eye screen and a right-eye screen, the processor 140 may control the display 150 so that the left-eye image may be displayed on the left-eye screen, and the right-eye image may be displayed on the right-eye screen.

For various embodiments, the processor 140 may control the display 150 to display the first VR 3D image and the second 3D image corresponding to the user's view using information on the user's view. The information on the user's view may include at least one of information obtained based on the positions of the user's pupils and information obtained based on the posture (i.e., orientation) of the wearable apparatus.

For various embodiments, the processor 140 may acquire 3D image data including a plurality of images through the content receiver 120. In this case, the 3D image data may be 3D image data including a left-eye image and a right-eye image captured horizontally or approximately horizontally to the ground surface. In this case, as the motion of the wearable display apparatus 100 is sensed through the sensor 130, the processor 140 may process the 3D image data and generate a first 3D image corresponding to a motion in which a roll component, among directional components (e.g., x, y, z, roll, pitch, and yaw components) of the motion of the wearable display apparatus 100, is excluded. The processor 140 may control the display 150 to display the first 3D image corresponding to the motion in which the roll component is excluded.

For various embodiments, the processor 140 may control the display 150 to display the second VR 3D image corresponding to a motion including the roll component as the motion of the wearable display apparatus 100 is detected. Then, as a user's head remains tilted after a predetermined time has elapsed, the processor 140 may control the display 150 to display the first VR 3D image instead of the second VR 3D image. The processor 140 may control the speaker 162 to output sound at the first position while the second VR 3D image is displayed, and control the speaker 162 to output sound at the same position as the first position while the first VR 3D image is displayed.

For various embodiments, the processor 140 may control the display 150 to display a second VR 3D image corresponding to the motion in which the roll component is included, as the motion of the wearable display apparatus 100 is detected. As a time elapses and a user's head remains tilted, the processor 140 may control the display 150 to display the first VR 3D image instead of the second VR 3D image. The processor 140 may control the speaker 162 to output sound at the first position while the second VR 3D image is displayed, and control the speaker 162 to output sound at the position same as the first position while the first VR 3D image is displayed.

For various embodiments, the processor 140 may control the display 150 to display a third VR 3D image corresponding to the user's view (i.e., field of view). When the motion of the wearable display apparatus is detected while the third VR 3D image is being displayed, the processor 140 may control the display 150 to display the third VR 3D image as the first VR 3D image corresponding to the motion in which the roll component is excluded. If the value of the roll component of the motion of the wearable display apparatus 100 is or becomes equal to or greater than a predetermined value, the processor 140 may control the display 150 to display the third VR 3D image as a 2D image.

For various embodiments, the processor 140 may generate the first VR 3D image using information on the user's view. The information on the user's view may include at least one of information obtained based on the positions of the user's pupils and information obtained based on the posture of the wearable display apparatus 100.

For various embodiments, the 3D image data may include a left-eye image and a right-eye image captured horizontally or approximately horizontally to the ground surface. In addition, the 3D image data may include 3D image data corresponding to a 360-degree VR 3D image or 3D image data corresponding to a user's view.

Figure 8A:
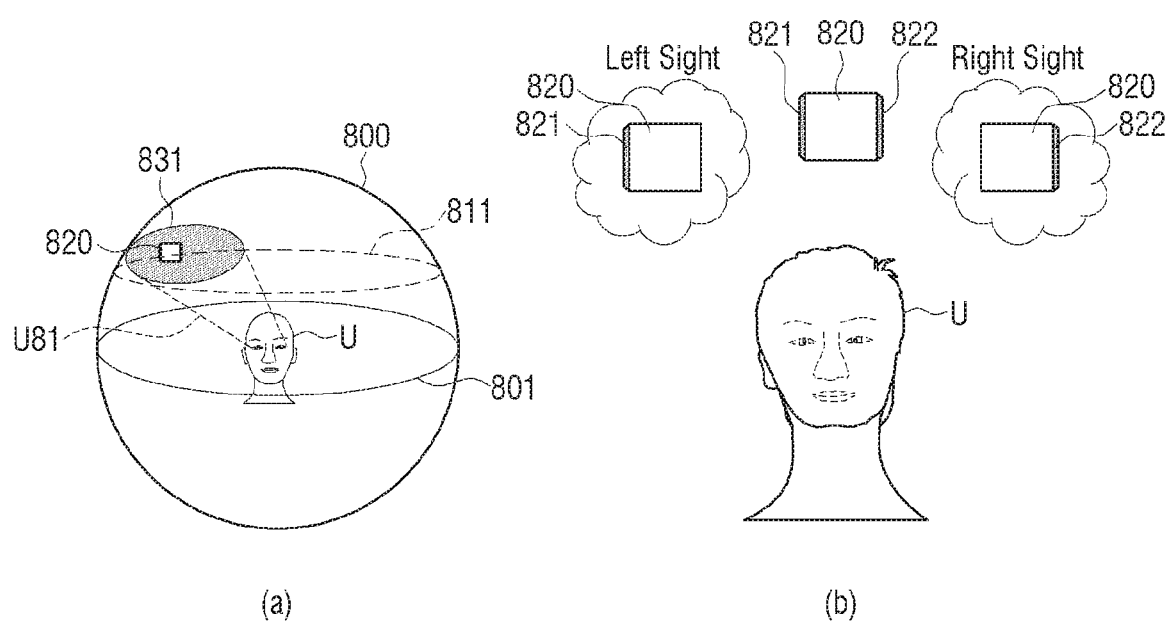
FIG. 8A is a usage view illustrating a wearable display apparatus according to an embodiment.

FIG. 8A is a usage view illustrating a wearable display apparatus according to an embodiment of the disclosure.

Figure 8B:
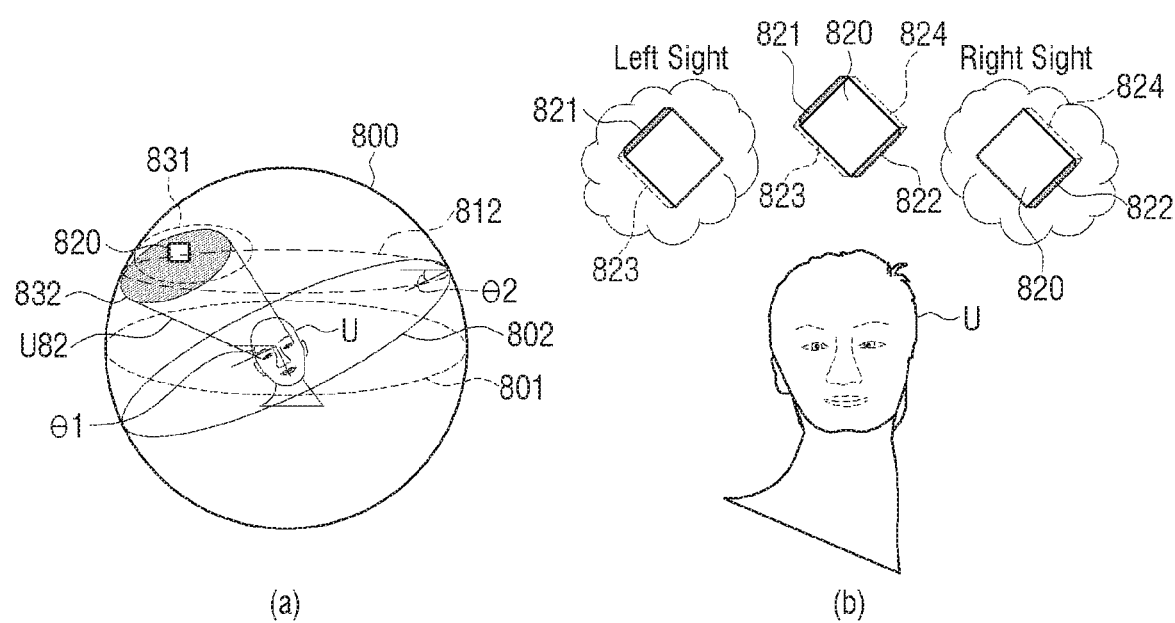
FIG. 8B is a usage view illustrating a wearable display apparatus according to an embodiment.
Figure 8C:
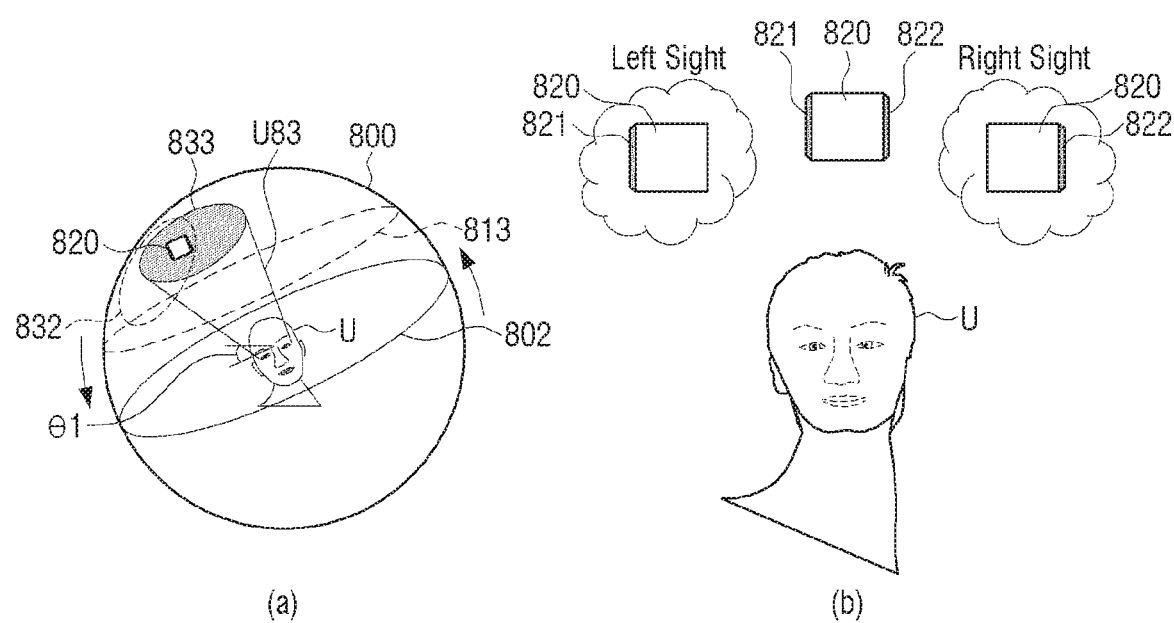
FIG. 8C is a usage view illustrating a wearable display apparatus according to an embodiment.

Referring to FIG. 8A, FIG. 8B and FIG. 8C, the wearable display apparatus 100 may control the display 150 to display a part of 360-degree VR 3D image.

It is assumed that the 360-degree VR 3D image may consist of VR sub-images having depth information.

For example, a 360-degree space may be photographed using a plurality of fish eye lenses having an angle of view of 180 degrees or more. A plurality of images photographed by the plurality of fish eye cameras may be projected on a spherical surface and generated as a left-eye spherical image and a right-eye spherical image. In this case, sub-images of the left and right spherical images may be extracted according to the designated angle of view, and a depth spherical image may be generated using overlap information between the sub-images of the left and right spherical images. The depth spherical image may be rendered on at least one of the left-eye spherical image and the right-eye spherical image to generate a 360-degree VR 3D image.

The 360-degree VR 3D image may be generated by processing the 3D image data obtained through the content receiver. The 3D image data may include a left-eye image and a right-eye image captured by a fish eye camera while the fish eye camera is horizontal or approximately horizontal to the ground surface.

Referring to (a) of FIG. 8A, the processor 140 of the wearable display apparatus 100 may obtain information on a view U81 of the user U. The information on the view U81 may be, for example, information on the range that can be seen by the user U. For example, the information on the view may include information on the sight, the viewing angle, the view orientation, the visual direction, and the like. The information on the view may be identified based on, for example, a sensing value that senses the positions of the user's pupils or a sensing value that senses the posture of the wearable display apparatus 100.

The processor 140 may display a first VR 3D image 831 (or a first VR sub-image) corresponding to the view U81 of the user U among the 360-degree VR 3D images 800. The user's head may be in a proper position. In this case, an image horizontal plane 811 of a first VR 3D image 831 corresponding to the view U81 of the user U may be parallel to a binocular horizontal plane 801, which is a horizontal reference of the user's eyes, or included in the binocular horizontal plane 801. In this case, the binocular horizontal plane 801, which is the horizontal reference of the user's eyes, may be parallel to the actual ground surface.

The processor 140 may display the first VR 3D image 831 as the rendered VR sub-image of the 360-degree VR 3D image 800, and display the first VR 3D image 831 by rendering only the image data necessary for the first VR 3D image 831.

Part (b) of FIG. 8A shows an object 820 included in the first VR 3D image 831 corresponding to the view of the user U. The object 820 may include, for example, a quadrangular pole. For example, as described above with reference to FIG. 4, the user U may view different images through the left-eye and the right-eye. For example, as shown in FIG. 8A, a left-eye image including the left side surface 821 of the object 820 may be displayed on the left-eye screen of the display 150, and a right-eye image including the right side surface 822 of the object 820 may be displayed on the right-eye screen. According to the difference between the left-eye image and the right-eye image, the user U may sense the 3D effect of the object 820.

As shown in (a) of FIG. 8B, the user U may lean or tilt the head to one side compared to the orientation of the user's head as shown in (a) of FIG. 8A.

As the user U tilts his or her head, the processor 140 may obtain information on a changed view U82 of the user U based on a motion Θ1 in which the roll component of the wearable display apparatus 100 is included. The processor 140 may control the display 150 to display the second VR 3D image 832 corresponding to the changed view U82 of the user among the 360-degree VR 3D images 800. In this case, an image horizontal plane 812, which is the horizontal reference of the second VR 3D image 832 corresponding to the view U82 of the user U, may be the same as the image horizontal plane 811, which is the horizontal reference of the first VR 3D image 831 in (a) of FIG. 8A. An intersection angle Θ2 at which the image horizontal plane 812 of the second VR 3D image 832 crosses a binocular horizontal plane 802, which is the horizontal reference of the user's eyes who tilts the head may be equal to or approximate to the angle of tilt of the head Θ1. The second VR 3D image 832 having the same image horizontal plane 812 as the image horizontal plane 811, which is the horizontal reference of the first VR 3D image 831 in (a) of FIG. 1 may be a 3D image corresponding to the motion Θ1 in which the roll component is included.

Part (b) of FIG. 8B shows an oblique object 820 included in the second VR 3D image 832 corresponding to the changed view U82 of the user. The object 820 in (b) of FIG. 8B may be the same object as that in (b) of FIG. 8A. Only sides 821 and 822 among sides 821 to 824 of the oblique object 820 may be displayed through the display 150.

For example, when a 360-degree VR 3D image is generated, as a plurality of fish eye cameras move vertically or horizontally and photograph a plurality of images, Information on the left side surface 821 and the right side surface 822 may be obtained as image information on the side surfaces of the object 820, but information on the surfaces 823 and 824 may not be obtained. Accordingly, when rendering the object 820 of (b) of FIG. 8B, which corresponds to the changed view U82 of the user, the processor 140 may render image information on an upper left side surface 821 corresponding to the left side surface 821 in (b) of 8A, and a lower right side surface 822 corresponding to the right side surface 822 in (b) of FIG. 8A, but may not render image information on a lower left side surface 823 and an upper right side surface 824 of the object 820.

As described above, as only some of the side surfaces of the object 820 are displayed, a user may feel a sense of three dimensions of the object 820 unnaturally. In addition or instead, the user may recognize the object 820 of FIG. 8A and the object 820 of FIG. 8B as different objects when they should be recognized as the same object.

Accordingly, referring to (a) of FIG. 8C, the processor 140 may control the display 150 such that a third VR 3D image 833 including the object 820 non-inclined from the viewpoint of the user U may be displayed. In this case, an image horizontal plane 813, which is the horizontal reference of the third VR 3D image 833 corresponding to a view U83 of the user U, may be parallel to a binocular horizontal plane 802, which is the horizontal reference of the user's eyes after the user tilts the head, or may be included in the binocular horizontal plane 802. The third VR 3D image 833 having the image horizontal plane 813 different from the image horizontal plane 811, which is a horizontal reference of the first VR 3D image 831 in (a) of FIG. 8A may be a 3D image corresponding to the motion in which the roll component, among the components of the motion Θ1, is excluded.

As a predetermined time elapses, the processor 140 may control the display 150 such that the second VR 3D image 832 in (a) of FIG. 8B may gradually rotate to be displayed up to the angle of the detected tilt Θ1 of the head in (a) in FIG. 8B. When the predetermined time has elapsed, the processor 140 may control the display 150 to display the third VR 3D image 833 of (a) of FIG. 8C as a result of the rotation. In other words, the displayed image may gradually transition from the second VR 3D image 832 to the third VR 3D image 833 over the predetermined time. The third VR 3D image 833 may include at least a portion of the second VR 3D image 832 of (a) of FIG. 8B and may be the same as the first VR 3D image 831 of (a) of FIG. 8A.

When rotations of the second VR 3D image 832 and the audio related to the second VR 3D image 832 are performed quickly, a user may feel confused by perceiving unnatural rotation, or the immersive feeling of viewing the second VR 3D image 832 may be deteriorated. Accordingly, the processor 140 may need to gently rotate the second VR 3D image 832 within a predetermined time so that the user hardly feels the rotation of the second VR 3D image 832.

Therefore, the predetermined time may be, for example, within 30 ms, and preferably within 18 ms so that the user hardly recognizes the motion of the object. However, the disclosure is not limited thereto.

Part (b) of FIG. 8B shows the object 820 included in the third VR 3D image 833 of (a) of FIG. 8C. The user U may tilt their head.

The object 820 may, for example, may be the same object as the object 820 of FIG. 8A and FIG. 8B. As the second VR 3D image 832 rotates, the inclined object 820 included in the second VR 3D image 832 may gradually rotate such that the object 820 non-inclined from the viewpoint of the user U may be displayed. The side surfaces of the non-inclined object 820 may be displayed. The left side surface 821 and the right side surface 822 suitable for the posture of the object 820 may be displayed to provide an appropriate 3D effect.

Accordingly, the user may naturally experience the 3D effect of the object 820, and the problem of cognitive discordancy that the user feels when looking at the object 820 in FIG. 8B may be solved. In other words, the user who views a 360-degree 3D image may continuously feel a sense of immersion, and thus the optimal viewing environment may be provided.

Figure 9A:
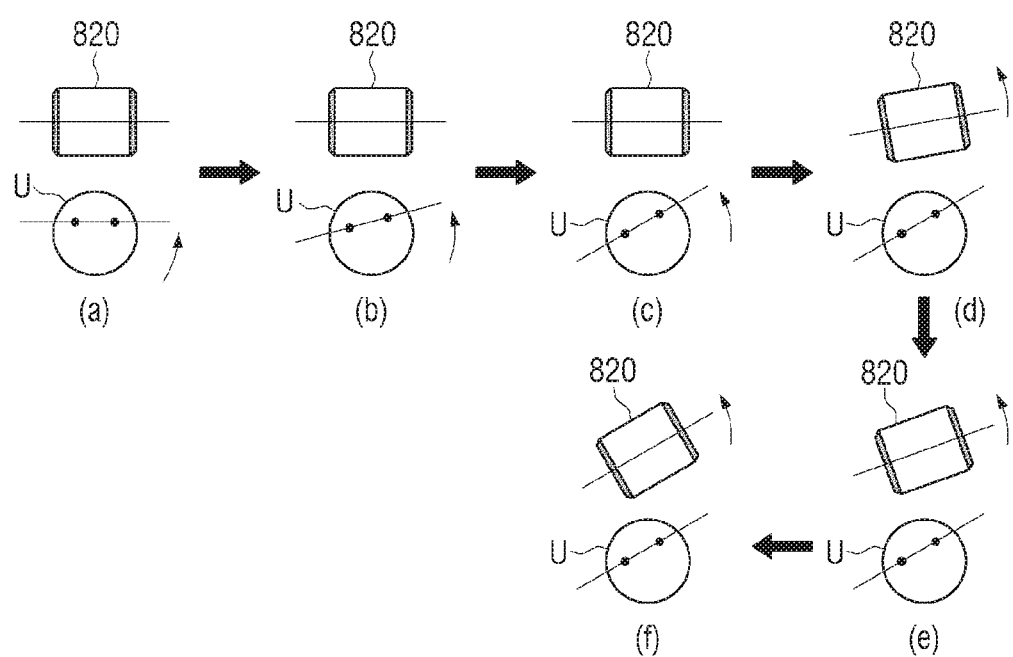
FIG. 9A is a usage view illustrating a wearable display apparatus according to an embodiment.

FIG. 9A and FIG. B are usage views illustrating a wearable display apparatus according to an embodiment of the disclosure.

Referring to FIG. 9A, as a user tilts the head, the processor 140 may control the display 150 such that the object 820 having a less clear third dimension included in the second VR 3D image 832 may be rotated so that the object 820 having a clear third dimension included in the third 3D image 833 may be displayed.

For example, referring to (a) to (c) of FIG. 9A, after the user U tilts their head, the processor 140 may control the display 150 such that the second VR 3D image 832 including the object 820 may gradually rotate to be displayed as a predetermined time passes. For example, if the rotation of the display apparatus 100 is sensed by the sensor 130 and the rotation of the display apparatus 100 is no longer sensed for a predetermined time, as shown in (d), (e) and (f) of FIG. 9A, the processor 140 may begin to rotate the object 820.

Figure 9B:
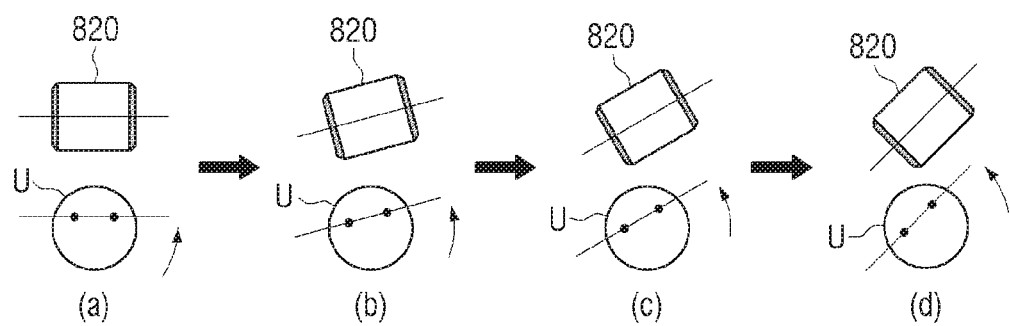
FIG. 9B is a usage view illustrating a wearable display apparatus according to an embodiment.

Alternatively, as shown in (a), (b), (c) and (d) of FIG. 9B, the processor 140 may control the display 150 such that the second VR 3D image 832 including the object 820 may rotate to be displayed at the same time as the head of the user U is being tilted. For example, the processor 140 may rotate the object 820 at a tilt corresponding to the tilt of the head of the user U detected at a predetermined period.

The processor 140 may control the display 150 such that the second VR 3D image 832 including the object 820 may gradually rotate to be displayed in consideration of the speed at which the user U tilts the head.

For example, the sensor 130 may track the movement of the head of the user U using six directional components (x, y, z, roll, pitch and yaw). The sensor 130 may measure the degree of tilt of the head of the user U in consideration of the change in the roll component. The rotation speed of the second 3D image 832 may be identified in consideration of the rotation speed of the roll component of the tracked movement. Specifically, when the rotational speed of the head of the user U is Rh(t) and the rotational speed of the image is Rv(t) during a time t, the processor 140 may control such that Rv(t) may follow Rh(t) continuously. For example, while the rotational speed Rh(t) of the head of the user U is changing significantly, the processor 140 may identify the speed at which Rv(t) follows Rh(t) relatively quickly. While the rotational speed Rh(t) of the head of the user U is changing insignificantly, the processor 140 may identify the speed at which Rv(t) follows Rh(t) relatively slowly.

Figure 10:
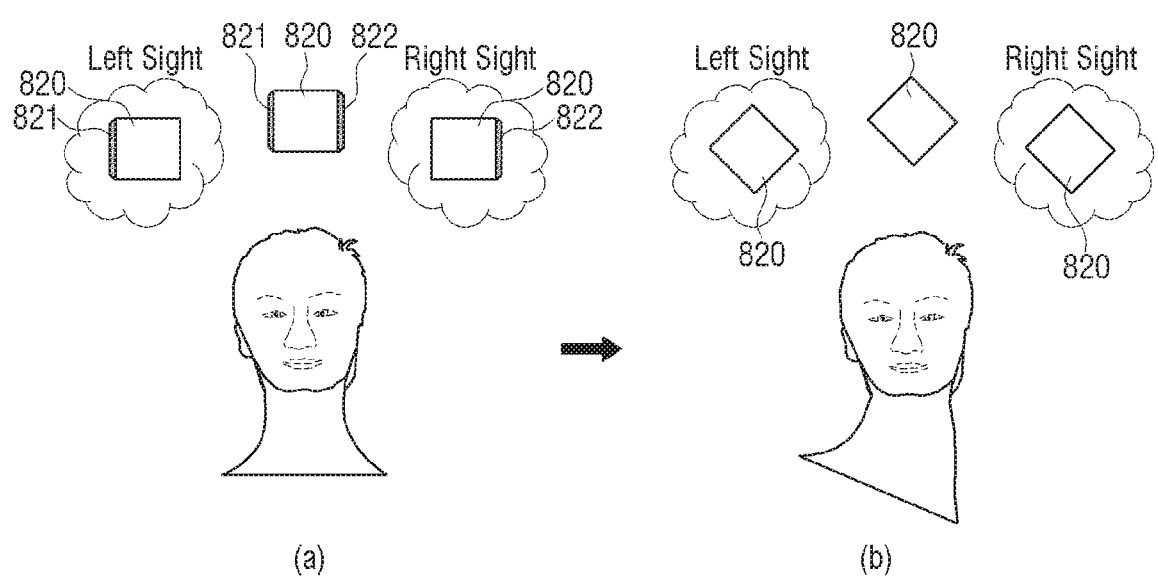
FIG. 10 is a usage view illustrating a wearable display apparatus according to an embodiment.

FIG. 10 is a usage view illustrating a wearable display apparatus according to an embodiment of the disclosure.

Referring to (a) of FIG. 10A, the processor 140 may control the display 150 to display the object 820 included in the 3D image corresponding to the view of the user U. The object 820 included in the 3D image may be the object 820 included in the first VR 3D image 831 of (b) of FIG. 8A.

Referring to (b) of FIG. 10, when the user U tilts the head to one side, the processor 140 may control the display 150 to display the object 820 included in the 3D image corresponding to the changed view of the user U. As shown, the processor 140 may control the display 150 so that the object 820 may be displayed without a 3D effect.

In other words, as shown in FIG. 8B, when the wearable display apparatus 100 includes image information on only some of the side surfaces of the object 820, the user may feel a 3D effect of the object 820 unnaturally. Accordingly, the processor 150 may prevent a user from incorrectly perceiving the object 820 by not displaying image information on the side surfaces of the object 820, i.e. by displaying the object 820 in 2D rather than in 3D.

For various embodiments, the processor 140 may selectively display the object 820 in 3D or in 2D according to the angle of tilt of the head of the user U. For example, as the user U tilts his or her head, the processor 140 may identify the degree of tilt of the wearable display apparatus 100 based on the value sensed by the sensor 130. When the degree of tilt of the display apparatus 100 is smaller than a predetermined value, the processor 140 may control the display unit 150 to gradually display the second VR 3D image 832 including the object 820. If the degree of tilt of the wearable display apparatus 100 is equal to or greater than a predetermined value, the processor 140 may control the display 150 to display the second VR 3D image 832 including the object 820 as a 2D image.

For another example, when the rotational angular speed at which the head of the user U is rotated is smaller than a predetermined value, the processor 140 may control the display 150 such that the second VR 3D image 832 including the object 820 may gradually rotate to be displayed. On the other hand, if the rotational angular speed at which the head of the user U is rotated is equal to or greater than a predetermined value, the processor 140 may control the display 150 to display the second VR 3D image 832 including the object 820 as a 2D image.

Figure 11:
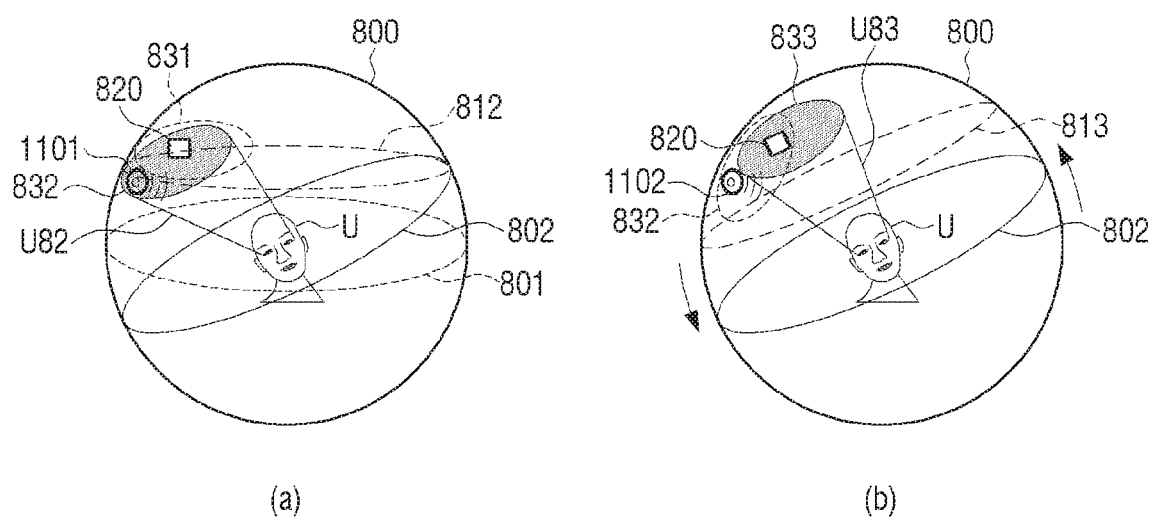
FIG. 11 is a usage view illustrating a wearable display apparatus according to an embodiment.

FIG. 11 is a usage view illustrating a wearable display apparatus according to an embodiment of the disclosure.

Referring to (a) of FIG. 11, as the user U tilts the head, the processor 140 may control the display 150 such that the second VR 3D image 832 corresponding to the changed view U82 of the user U may be displayed. The processor 140 may control the speaker 162 so that the sound related to the second VR 3D image 832 may be output from a first position 1101.

Referring to (b) of FIG. 11, as a predetermined time passes, the processor 140 may control the display 150 such that the second VR 3D image 832 may gradually rotate up to the angle corresponding to the tilt of the head and the third VR 3D image 833 may be displayed. The processor 140 may control the speaker 162 so that the sound related to the third VR 3D image 833 may be output from a second position 1102. As shown in FIG. 11, the first position 1101 and the second position 1102 may be the same or close to each other.

Even if the second VR 3D image 832 is rotated, the processor 140 may prevent hearing confusion felt by a user who views a 3D image by controlling the speaker 162 to output sounds from the same position regardless of which of the second VR 3D image 832 and the third VR 3D image 833 is displayed.

Figure 12:
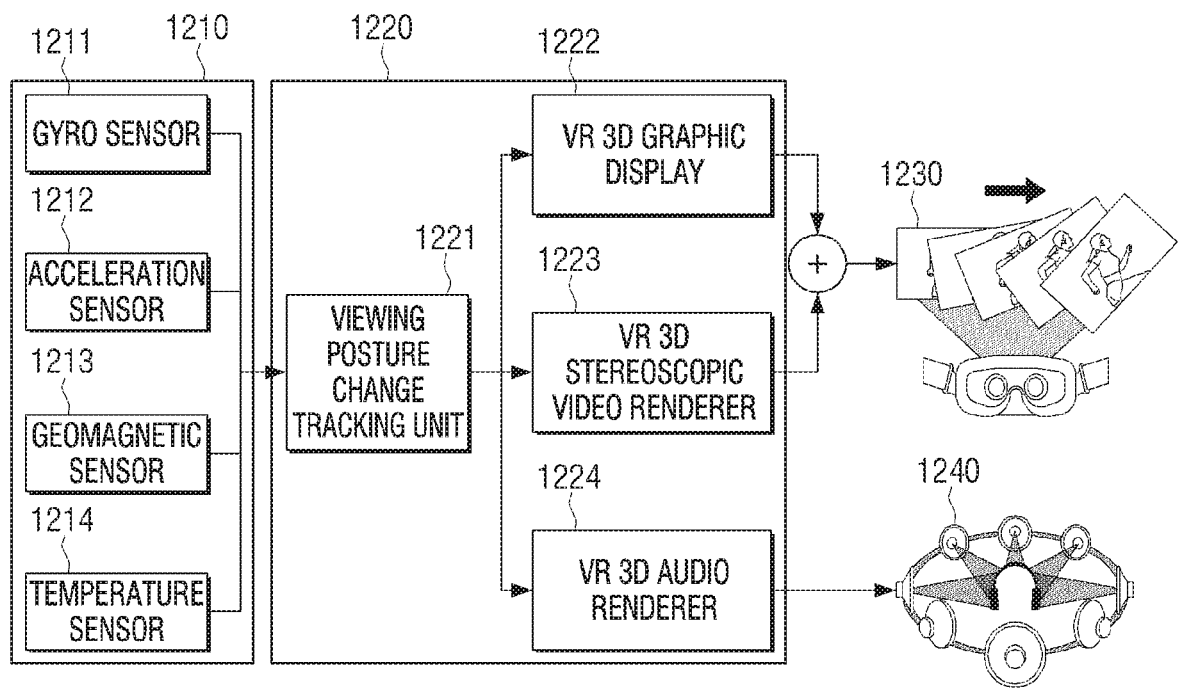
FIG. 12 is a view illustrating configuration of a wearable display apparatus according to an embodiment.

FIG. 12 is a view illustrating configuration of a wearable display apparatus according to an embodiment of the disclosure.

Referring to FIG. 12, a wearable display apparatus 100 may include a sensor (or, a sensing unit) 1210 and a processor 1220. The sensor 1210 of FIG. 12 may correspond to the sensor 130 of FIG. 7, and the processor 1220 may correspond to the processor 140 of FIG. 7.

Referring to FIG. 12, the sensor 1210 may include a gyro sensor 1211, an acceleration sensor 1212, a geomagnetic sensor 1213, and a temperature sensor 1214. The gyro sensor 1211, the acceleration sensor 1212 and the geomagnetic sensor 1213 may correspond to the gyro sensor 132, the acceleration sensor 131 and the geomagnetic sensor 133 of FIG. 7 described above. Therefore, the repeated description will be omitted. The temperature sensor 1214 may sense the ambient temperature of the wearable display apparatus 100.

The sensor 1210 may sense the motion and posture of the wearable display apparatus 100. For example, the motion of the wearable display apparatus 100 may be sensed by at least one of the gyro sensor 1211, the acceleration sensor 1212, and the geomagnetic sensor 1213 to identify the motion of the wearable display apparatus 100. Alternatively, the current posture of the wearable display apparatus 100 may be sensed by at least one of the gyro sensor 1211, the acceleration sensor 1212, and the geomagnetic sensor 1213 to identify the posture of the wearable display apparatus 100.

The processor 1220 may include a viewing posture change tracking unit 1221, a VR 3D graphic display 1222, a VR 3D stereoscopic video renderer 1223, and a VR 3D audio renderer 1224.

The viewing posture change tracking unit 1221 may identify the basic posture or motion information of the wearable display apparatus 100 based on the sensing value (e.g., the tilt of the wearable display apparatus 100) acquired from the sensor 1210. The viewing posture change tracking unit 1221 may correct the basic posture or the motion information using the values sensed by the geomagnetic sensor 1213 and the temperature sensor 1214 and identify the final motion or posture of the wearable display apparatus 100.

For various embodiments, the viewing posture change tracking unit 1221 may obtain the basic posture or motion information of the wearable display apparatus 100 from at least one of the gyro sensor 1211 and the acceleration sensor 1212. The viewing posture change tracking unit 1221 may correct the basic posture or motion information identified using the values detected by the geomagnetic sensor 1213 and the temperature sensor 1214 to identify the motion or posture of the wearable display apparatus 100.

The processor 1220 may display a 3D image corresponding to the user's view based on the motion or posture of the wearable display apparatus 100 identified by the viewing posture change tracking unit 1221. For example, the processor 1220 may obtain image data including a left-eye image and a right-eye image. The processor 1220 may process the image data corresponding to the user's view in the image data as a VR 3D image. For example, a VR 3D graphic display 1222 may process graphics of the image data, and a VR 3D stereoscopic video renderer 1223 may process the video. Specifically, when the user tilts their head, the VR 3D graphic display 1222 and the VR 3D stereoscopic video renderer 1223 may simultaneously process graphics and video so that the VR 3D image I230 may be gradually rotated and displayed.

The VR 3D audio renderer 1224 may adjust at least one of the position, direction and angle at which the VR 3D audio I240 is output while the VR 3D image I230 is gradually rotated. For example, a VR 3D audio renderer 1224 may render the audio data so that sound associated with the VR 3D image I230 may be output at the first position while the VR 3D image I230 is being displayed, and render audio data so that sound corresponding to the rotated second VR 3D image may be output at position that is the same as or approximate to the first position.

Figure 13:
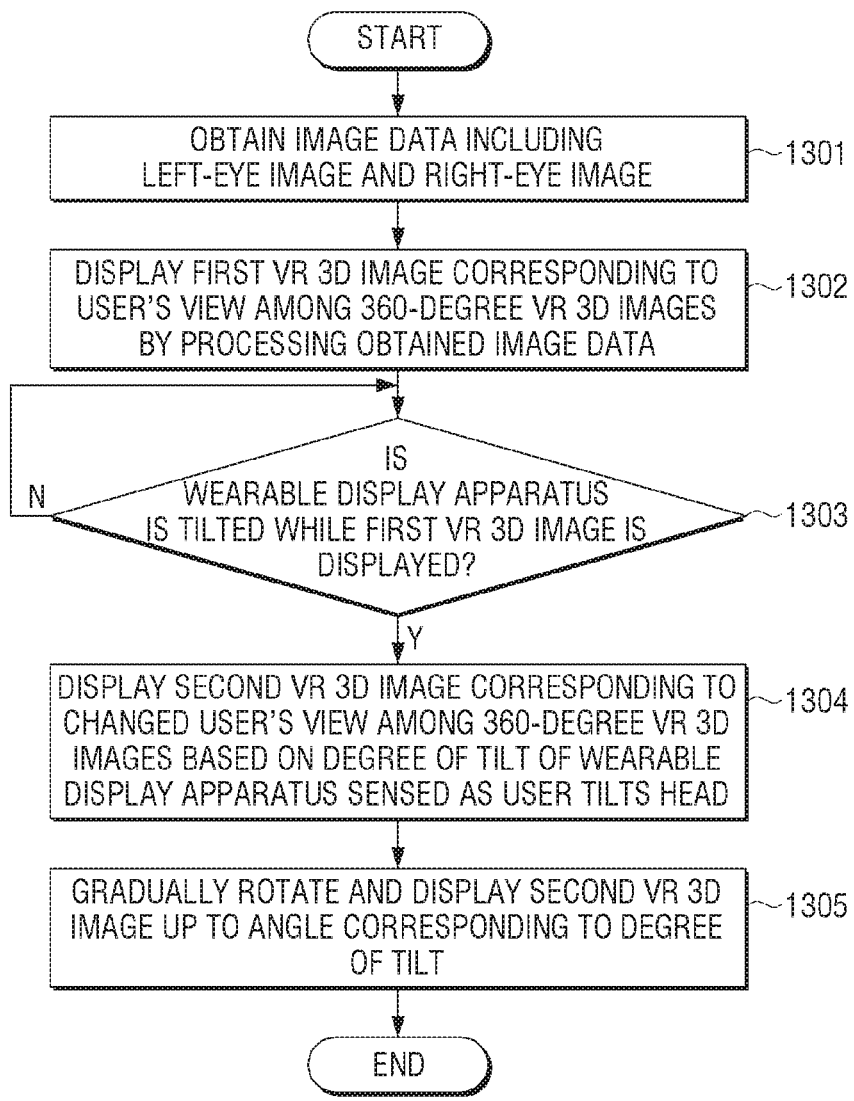
FIG. 13 is a flowchart illustrating a method of displaying a 3D image according to an embodiment.

FIG. 13 is a flowchart illustrating that a wearable apparatus displays a 3D image according to an embodiment of the disclosure.

A wearable display apparatus 100 may obtain image data including a left-eye image and a right-eye image at operation 1301.

The wearable display apparatus 100 may process the obtained image data and display a first VR 3D image corresponding to a user's view among 360-degree VR 3D images at operation 1302.

While the first VR 3D image is displayed, the wearable display apparatus 100 may identify whether the wearable display apparatus is tilted at operation 1303.

If it is identified that the wearable display apparatus 100 is tilted at operation 1303 (Y), based on the degree of tilt of the wearable display apparatus sensed as the user tilts their head, the wearable display apparatus 100 may display a second VR 3D image corresponding to the changed user's view among 360-degree VR 3D images at operation 1304.

The wearable display apparatus 100 may gradually rotate and display the second VR 3D image up to the degree of tilt at operation 1305.

For example, after a user tilts their head, the wearable display apparatus 100 may gradually rotate and display a second 3D image as a predetermined time passes. The wearable display apparatus 100 may gradually rotate and display a second 3D image while a user's head remains tilted.

For various embodiments, when gradually rotating and displaying the second VR 3D image, the wearable display apparatus 100 may gradually rotate the second VR 3D image to display the first VR 3D image.

For various embodiments, the wearable display apparatus 100, when gradually rotating and displaying the second VR 3D image, if the degree of tilt is smaller than a predetermined value, may gradually rotate and display the second VR 3D image, and if the degree of tilt is equal to or greater than a predetermined value, may display the second VR 3D image as a 2D image.

For various embodiments, the wearable display apparatus 100 may output sound related to the second VR 3D image at the first position while the second VR 3D image is displayed, and output sound corresponding to the second VR 3D image after rotation at the position same as or close to the first position while the rotated second VR 3D image is displayed.

Figure 14:
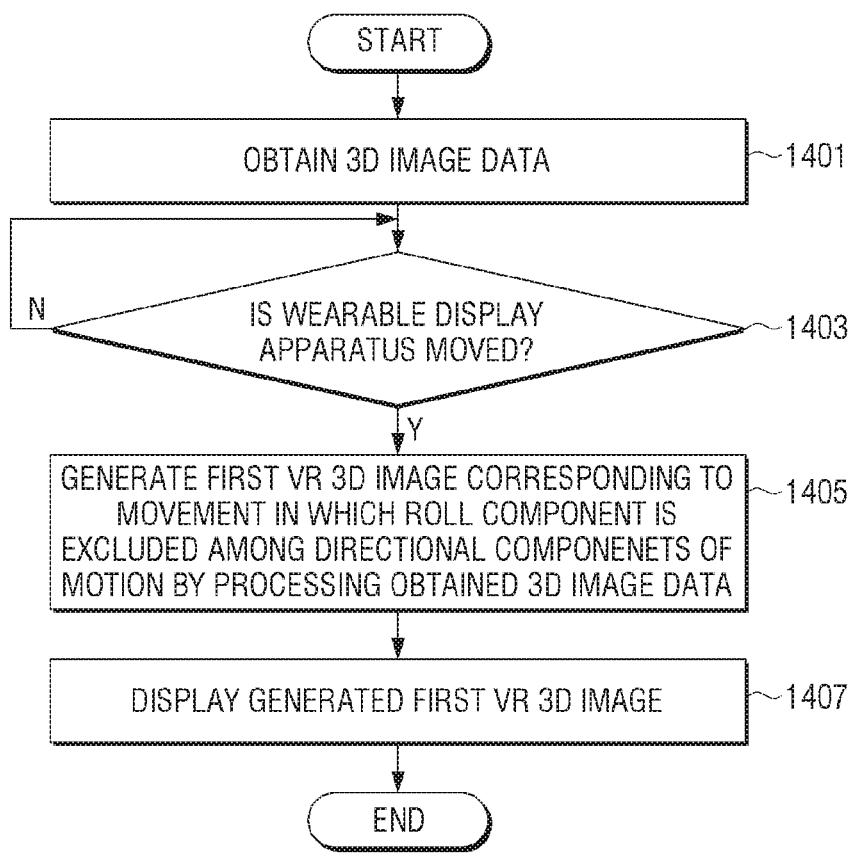
FIG. 14 is a flowchart illustrating that a method of displaying a 3D image according to an embodiment.

FIG. 14 is a flowchart illustrating that a wearable apparatus displays a 3D image according to an embodiment of the disclosure.

The wearable display apparatus 100 may obtain 3D image data at operation 1401. The 3D image data may include a left-eye image and a right-eye image captured while the wearable display apparatus is horizontal to or approximately horizontal to a ground surface. In addition, the 3D data may include 3D image data corresponding to a 360-degree VR 3D image or 3D image data corresponding to a user's view.

The wearable display apparatus 100 may identify whether the wearable display apparatus 100 moves at operation 1403.

If it is identified that the wearable display apparatus 100 moves at operation 1403 (Y), the wearable display apparatus 100 may process the obtained 3D image data, and generate a first VR 3D image corresponding to a motion in which a roll component is excluded among directional components of the motion at operation 1405.

The wearable display apparatus 100 may display the generated first VR 3D image at operation 1407.

For various embodiments, as the motion of the wearable display apparatus 100 is sensed, the wearable display apparatus 100 may display a second VR 3D image corresponding to the motion including a roll component. After a predetermined time passes, the wearable display apparatus 100 may display the first VR 3D image instead of the second VR 3D image.

For various embodiments, as the motion of the wearable display apparatus 100 is sensed, the wearable display apparatus may display the second VR 3D image corresponding to the motion including a roll component. As a time passes, the wearable display apparatus 100 may gradually display the first VR 3D image in replacement of the second VR 3D image.

For various embodiments, while the second VR 3D image is displayed, the wearable display apparatus 100 may output sound at the first position. The wearable display apparatus 100 may output sound at the same position as the first position while the first VR 3D image is displayed.

The wearable display apparatus 100 may display a third VR 3D image corresponding to a user's view (i.e., field of view). While the third VR 3D image is displayed, the wearable display apparatus 100 may display the third VR 3D image as the first VR 3D image corresponding to the motion in which the roll component excluded as the motion of the wearable display apparatus 100 is detected. When a value of the roll component of the motion of the wearable display apparatus 100 is equal to or greater than a predetermined value, the wearable display apparatus 100 may display the third VR 3D image as a 2D image.

The wearable display apparatus 100 may generate the first VR 3D image by using information on the user's view. The information on the user's view may include at least one of information obtained based on the positions of user's pupils and information obtained based on the posture of the wearable display apparatus.

If it is identified that the wearable display apparatus 100 moves, the wearable display apparatus 100 may obtain 3D image data. The wearable display apparatus 100 may process the obtained 3D image data, generate the first VR 3D image corresponding to the motion in which the roll component is excluded among directional components of the motion and display the generated first VR 3D image.

It should be understood that the various embodiments of the disclosure and the terminology used are not intended to limit the techniques described in this document to specific embodiments, but rather should be understood to include various modifications, equivalents, and/or replacements. In the description of the drawings, like reference numerals may be used for similar elements. Singular forms are intended to include plural forms unless the context clearly indicates otherwise. In this document, the expressions such as "A or B," "at least one of A and/or B," "A, B, or C," or "at least one of A, B, and/or C" may include all possible combinations of listed components. Expressions such as "first", "second", or the like may be used to qualify the components, regardless of order or importance, and to distinguish one component from another, but are not limited to the constituent elements. When it is mentioned that any one component (e.g., the first component) is "(functionally or communicatively) connected" or "contacted to" another (e.g., the second component) component, any one constituent element may be directly connected to another constituent element, or may be connected through another component (e.g., the third component).

As used herein, the term "module" includes units constituting hardware, software, or firmware and may be used interchangeably with terms such as, for example, logic, logic blocks, components, or circuits. A module may be an integrally constructed component or a minimum unit or part thereof that performs one or more functions. For example, the module may be configured as an application-specific integrated circuit (ASIC).

Various embodiments of the disclosure may be embodied as software including commands stored in a machine-readable storage media (e.g., an internal memory 170 or a memory of an external content source 10) that can be read by a machine (e.g., a computer). The device may include an electronic device (e.g., a wearable display device 100) in accordance with the disclosed embodiments, which is an apparatus that can call stored commands from the storage medium and operate according to the called commands. When the command is executed by a processor (e.g., a processor 140), the processor may perform the function corresponding to the command, either directly or using other components under the control of the processor. The commands may include codes generated or executed by a compiler or an interpreter. The machine-readable storage medium may be provided in the form of a non-transitory storage medium. 'Non-transitory' means that the storage medium does not include a signal and is tangible, but does not distinguish whether data is permanently or temporarily stored in a storage medium.

According to an example, a method according to various embodiments disclosed herein may be provided in a computer program product. The computer program product may be traded between a seller and a purchaser as a product. The computer program product may include a machine readable storage medium (e.g., compact disc read only memory (CD-ROM)) that can be read by a device, or a program that can be transmitted over a wired or wireless network. For example, a computer program product may be distributed online via an application store (e.g., PlayStore™) and a computer (e.g., a wearable display device 100 or a content source 10) may download at least a portion of the computer program product and store the portion of the computer program product in the memory of the computer. In the case of on-line distribution, at least a portion of the computer program product may be temporarily stored, or temporarily generated, in a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

What is claimed is:
1. A wearable display apparatus, comprising:
   a display;
   a sensor configured to detect motion of the wearable display apparatus and output motion data corresponding to the motion of the wearable display apparatus, the output motion data including a non-zero roll component, a pitch component and a yaw component; and
   a processor configured to:
   obtain three-dimensional (3D) image data,
   obtain the output motion data from the sensor, generate a first virtual reality (VR) 3D image based on the obtained 3D image data, the pitch component and the yaw component included in the obtained motion data excluding the non-zero roll component, and
control the display to display the generated first VR 3D image.

2. The apparatus as claimed in claim 1, wherein the processor is further configured to:
generate a second VR 3D image based on the obtained motion data including the non-zero roll component,
control the display to display the generated second VR 3D image, and
control the display to display the first VR 3D image in replacement of the second VR 3D image after a predetermined time period.

3. The apparatus as claimed in claim 1, wherein the processor is further configured to:
generate a second VR 3D image based on the obtained motion data including the non-zero roll component,
control the display to display the generated second VR 3D image, and
control the display to gradually display the first VR 3D image in replacement of the second VR 3D image over a predetermined time period.

4. The apparatus as claimed in claim 3, wherein the wearable display apparatus further comprises a speaker, and
wherein the processor is further configured to:
control the speaker to output sounds at a first position while the second VR 3D image is displayed, and
control the speaker to output sounds at the first position while the first VR 3D image is displayed.

5. The apparatus as claimed in claim 1, wherein the processor is further configured to:
control the display to display a third VR 3D image corresponding to a field of view of a user, and
control the display to display the third VR 3D image as the first VR 3D image in response to the sensor detecting the motion of the wearable display apparatus while the third VR 3D image is displayed.

6. The apparatus as claimed in claim 5, wherein the processor is further configured to, based on a value of the non-zero roll component being equal to or greater than a predetermined value, control the display to display the third VR 3D image as a two-dimensional image.

7. The apparatus as claimed in claim 1, wherein the processor is configured to generate the first VR 3D image by using information regarding a field of view of a user, and
wherein the information regarding the field of view of the user includes at least one from among information obtained based on positions of pupils of the user, and information obtained based on a posture of the wearable display apparatus.

8. The apparatus as claimed in claim 1, wherein the 3D image data includes a left-eye image and a right-eye image captured at positions separated in a horizontal direction parallel to a ground surface.

9. The apparatus as claimed in claim 1, wherein the 3D image data includes data corresponding to a 360-degree VR 3D image, or data corresponding to a field of view of a user.

10. A method for displaying a three-dimensional (3D) image of a wearable display apparatus, the method comprising:
obtaining 3D image data;
obtaining motion data corresponding to a motion of the wearable display apparatus sensed by a sensor, the obtained motion data including a non-zero roll component, a pitch component and a yaw component;

generating a first virtual reality (VR) 3D image based on the obtained 3D image data and, the pitch component and the yaw component included in the obtained motion data excluding the non-zero roll component; and
displaying the generated first VR 3D image.

11. The method as claimed in claim 10, further comprising:
generating a second VR 3D image based on the obtained motion data including the non-zero roll component;
displaying the generated second VR 3D image; and
displaying the first VR 3D image in replacement of the second VR 3D image after a predetermined time period.

12. The method as claimed in claim 10, further comprising:
generating a second VR 3D image based on the obtained motion data including the non-zero roll component;
displaying the generated second VR 3D image; and
gradually displaying the first VR 3D image in replacement of the second VR 3D image over a predetermined time period.

13. The method as claimed in claim 12, further comprising:
outputting sounds at a first position while the second VR 3D image is displayed; and
outputting sounds at the first position while the first VR 3D image is displayed.

14. The method as claimed in claim 10, further comprising:
displaying a third VR 3D image corresponding to a field of view of a user; and
displaying the third VR 3D image as the first VR 3D image in response to detecting the motion of the wearable display apparatus while the third VR 3D image is displayed.

15. The method as claimed in claim 14, wherein the displaying of the third VR 3D image comprises, based on a value of the non-zero roll component being equal to or greater than a predetermined value, displaying the third VR 3D image as a two-dimensional image.

16. The method as claimed in claim 10, wherein the generating of the first VR 3D image comprises generating the first VR 3D image by using information regarding a field of view of a user, and
wherein the information regarding the field of view of the user includes at least one from among information obtained based on positions of pupils of the user and information obtained based on a posture of the wearable display apparatus.

17. The method as claimed in claim 10, wherein the 3D image data includes a left-eye image and a right-eye image captured at positions separated in a horizontal direction parallel to a ground surface.

18. The method as claimed in claim 10, wherein the 3D image data includes data corresponding to a 360-degree VR 3D image or data corresponding to a field of view of a user.

19. A computer readable recording medium, which includes computer-readable code that when executed by a wearable display apparatus causes the wearable display apparatus to:
obtain 3D image data;
obtain motion data corresponding to a motion of the wearable display apparatus sensed by a sensor, the obtained motion data including a non-zero roll component, a pitch component and a yaw component;

generate a first virtual reality (VR) 3D image based on the obtained 3D image data, the pitch component and the yaw component included in the obtained motion data excluding the non-zero roll component;

control a display of the wearable display apparatus to display the generated first VR 3D image.

\* \* \* \* \*